United States Patent [19]

Yamamoto et al.

[11] Patent Number: 5,401,812
[45] Date of Patent: Mar. 28, 1995

[54] THERMOSETTING POLYIMIDE COMPOSITION, THERMOSET PRODUCT THEREOF AND MANUFACTURING PROCESS THEREOF

[75] Inventors: Hiroshi Yamamoto, Moriguchi; Taro Fukui, Osaka, both of Japan

[73] Assignee: Matsushita Electric Works, Ltd., Osaka, Japan

[21] Appl. No.: 994,226

[22] Filed: Dec. 21, 1992

[30] Foreign Application Priority Data

Dec. 24, 1991 [JP] Japan .................................. 3-357075
Mar. 13, 1992 [JP] Japan .................................. 4-089537
Oct. 7, 1992 [JP] Japan .................................. 4-296319

[51] Int. Cl.$^6$ ............................................. C08L 79/06
[52] U.S. Cl. ..................................... 525/426; 525/436; 525/928; 525/425; 528/353
[58] Field of Search ................. 525/436, 928, 426, 425; 528/353

[56] References Cited

U.S. PATENT DOCUMENTS

| | | | |
|---|---|---|---|
| 4,816,526 | 3/1989 | Bristowe | 525/422 |
| 4,908,409 | 3/1990 | Oikawa | 528/188 |
| 4,985,509 | 1/1991 | Matuura | 525/421 |
| 4,987,207 | 1/1991 | Yamaya | 528/170 |
| 5,037,689 | 8/1991 | Boyd | 428/113 |
| 5,206,340 | 4/1993 | Tsutsumi | 528/353 |

FOREIGN PATENT DOCUMENTS

0311349 4/1989 European Pat. Off. .
0382575 8/1990 European Pat. Off. .

OTHER PUBLICATIONS

K. Yamanaka et al. ("Yamanaka I"), Structure Development in Epoxy Resin Modified With Poly(ether sulphone), Polymer, pp. 662-667 (1989).
K. Yamanaka et al. ("Yamanaka I"), Reaction-Induced Phase Separation in Rubber-Modified Epoxy Resins, Polymer, vol. 60, pp. 1839-1844 (1989).

*Primary Examiner*—James J. Seidleck
*Assistant Examiner*—I. Zemel
*Attorney, Agent, or Firm*—Kenyon & Kenyon

[57] ABSTRACT

A thermosetting polyimide composition is provided with a sufficient heat resistance and excellent mechanical and electrical characteristics in toughness, flexibility and so on and under severe environmental conditions, by adding to a polyfunctional unsaturated imide a thermosetting resin selected from the group consisting of polyetherimide, polyarylate and polyamideimide which are in a miscibility region with the polyfunctional unsaturated imide and have an excellent glass transition point and a number-average molecular weight of more than 10,000.

9 Claims, 15 Drawing Sheets

THERMOSETTING POLYIMIDE COMPOSITION, THERMOSET PRODUCT THEREOF AND MANUFACTURING PROCESS THEREOF

BACKGROUND OF THE INVENTION

This invention relates to a thermosetting polyimide composition high in the heat resistance, excellent in such mechanical characteristics as toughness, flexibility, adhesion and so on, and utilizable as a circuit-printing film, laminating plate, structural material, adhesive, molding material, sealing medium such as encupsulant for IC's and the like; to a thermoset product of The composition; and to a manufacturing process for the composition.

DESCRIPTION OF RELATED ART

Generally, polyimide has been commonly employed in many fields where the heat resistance is required. This polyimide may be classified roughly into a first type obtained through forming at a stage of the precursor of the polyimide, that is, in a state of the polyamide acid and a subsequent heat treatment for causing an imide ring closure, and a second type obtained through a heat crosslinking of an oligomer having imide ring.

For the first type polyimide, there are various products available in such trademarks as VESPEL, KAPTON, UPIREX, PYRALIN and so on, which are showing extremely high heat resistance but, on the other hand, causing a problem to arise in the treatment as molding or the like due to that they become non-soluble and non-fusible during the molding work. In order to render the molding or the like treatment to be easier, on the other hand, there have been suggested various polymers of which the molecular structure of which is so devised such as to produce a sufficient thermal plasticity. With these polymers, however, their molded products will be in fused state at a temperature above their molding temperature so as to remarkably render their heat resistance deteriorated, and their application to the use in which the inherent heat resistance of polyimide will have to be restricted.

On the other hand, the second type thermosetting polyimide obtained by heat-crosslinking the oligomer having imide ring is freely moldable, still non-soluble or non-fusible in the molded products, and high in the heat resistance, so that this type of polyimide has been frequently utilized in many fields in which a high reliability under severe environmental conditions, in such aspects as multilayered printed-circuit substrate for use in large scale computers, functional parts in and around engines for vehicles, various parts of spaceships and aircrafts, and so on.

Such poly-unsaturated imide as represented by a following general formula (1) allows a hard molded product extremely high in the crosslink density to be obtained through polymerization and crosslinking:

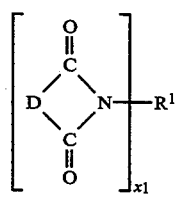
(1)

In the above formula (1), "D" represents a bivalent group having at least one the carbon-carbon double bond, "R'" denotes an $x_1$-valent organic group, and "$x_1$" represents an integer more than 1.

A typical one of this poly-unsaturated imide is bis-maleimide represented by a following formula (2):

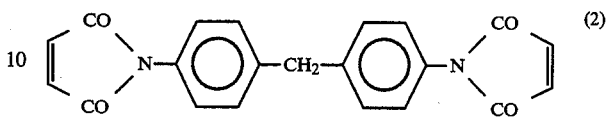

However, a composition obtained with such bismaleimide employed is defective as being very brittle, and thus in the toughness, workability and impact properties. Accordingly, there have been employed resins obtained by modifying a monomer of this bismaleimide with various crosslinking agents while such resins are more or less deteriorated in the heat resistance. A typical one of these resins will be polyaminobismaleimide resin obtained by Using diamine as the crosslinking agent, which includes products available in trademarks of KERIMID, KINEL and so on. More specifically, these resins are obtained from an oligomer of bismaleimide and diamine with Michael addition, which oligomer being heated for simultaneous development of the polymerization and crosslinking. As another example, there may be enumerated polyimide and the like which can be obtained with (poly)cyanate-ester compound employed as the crosslinking agent instead of diamine.

Generally speaking, the foregoing polyimide resins obtained by modifying bismaleimide monomer with the various crosslinking agents may be appreciated to have been improved to some extent in respect of the toughness or the flexibility in contrast to that of bismaleimide alone, but the improvement still has not reached a sufficiently satisfactory level.

In this connection, there has been suggested a measure for improving the toughness or flexibility of the thermosetting resin, in general, by adding a flexible component represented by elastomer to a thermosetting resin composition. In a composition of bismaleimide in which a liquid nitrile rubber having at both ends carboxyl groups (such ones as known in trademark HYCAR CTBN and so on) is blended, for example, there is formed a so-called domain structure of phase separation in which spherical domains of rubber are dispersed in imide matrix. However, it has been found that, even with this composition, the improvement in the toughness or flexibility has not been attained so much as has been expected.

For the measure of improving the thermosetting polyimide resin composition in respect of the toughness and flexibility, further, it has been suggested to introduce a thermoplastic resin in the composition, as taught in, for example, European Patent Publication No. 0 311 349 A3 by Patrick T. McGrail et al and No. 0 382 575 A3 by Hajime Kishi et al. However, the compositions shown in these publications are still defective in the heat resistance due to that the glass transition point has not been sufficiently elevated, and also in the electric characteristics which have not reached any satisfactory level required under conditions of the temperature, humidity, frequency and so on in wide ranges. In particular, the "polymer composition" taught by McGrail et al employs polyarylsulphone as the additive thermoplastic resin, so that the glass transition point is left to reach only about 238° C., and the other "thermosetting resin composition, cured resin product, prepreg and fiber resinforced plastic" of Kishi et al is shown to have a siloxane oligomer of a low molecular weight added as the thermoplastic resin, so as to have a glass transition point of only about 120° to 180° C.

Consequently, any one of the foregoing known compounds has not reached the sufficiently satisfactory level for use in forming such parts to be employed under the severe ambient conditions as the functional parts used in and around the engine for vehicles, various parts of spaceships and aircrafts and so on, which are desired to have a glass transition point exceeding 250° C.

SUMMARY OF THE INVENTION

A primary object of the present invention is, therefore, to provide a thermosetting polyimide composition which can be of a glass transition temperature sufficiently high as required, a heat resistance maintained to be high, and mechanical characteristics made excellent in respect of the toughness, flexibility, adhesion and so on, as well as a thermoset product of the composition, and a process for manufacturing the compound.

Another object of the present invention is to provide a thermosetting polyimide composition maintaining a high heat resistance, and showing extremely excellent electrical characteristics under conditions of the temperature, humidity, frequency and so on in their wide ranges, as well as a thermoset product of the composition and a process for manufacturing the compound.

Other objects and advantages of the present invention will be made clear in following description detailed with reference to practical examples of the present invention and to accompanying drawings.

Figure 1:
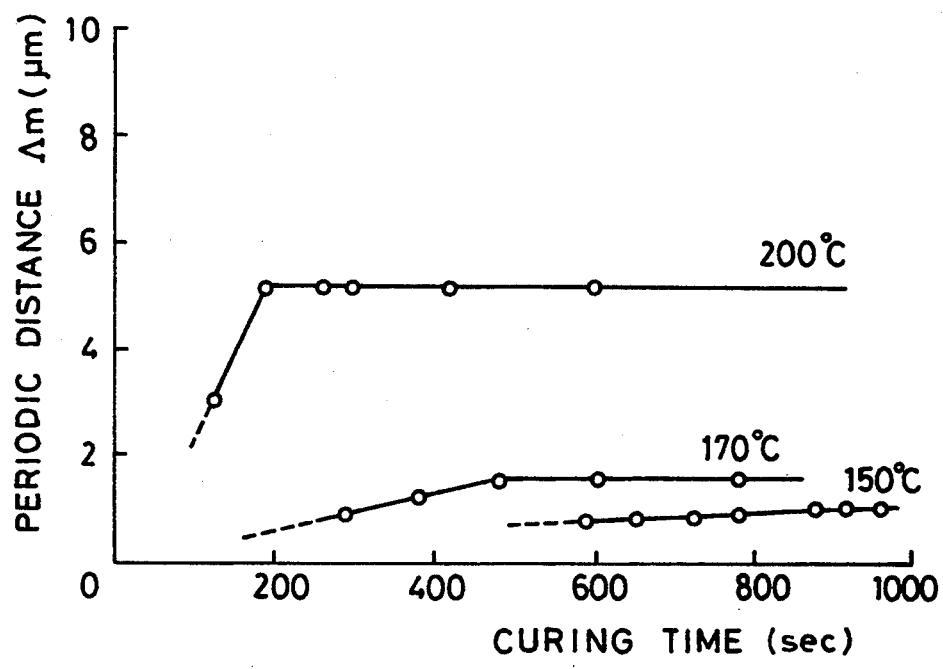
FIG. 1 is a graphical illustration of variation with time in the periodic distance $\Lambda m$ when samples of Examples 1 to 3 are respectively cured at 150° C., 179° C. and 200° C.

While the present invention shall be described in the followings with reference to various examples of the invention, it will be readily appreciated that the intention is not to limit the invention to these examples only but rather to include all alterations, modifications and equivalent arrangements possible within the scope of appended claims.

DETAILED DESCRIPTION OF THE PREFERRED EXAMPLES

First, in the present invention, the polyimide composition can be made excellent in the heat resistance and further can be improved to a sufficient level in such mechanical properties as the toughness, flexibility, adhesion and so on, with a use of a specific resin as the thermoplastic resin to be introduced into the polyimide composition.

Here, the thermosetting polyimide composition employed in the present invention contains as essential components such polyfunctional unsaturated imide that represented by the foregoing formula (1) and a thermoplastic resin, and the latter resin consists of one or a combination of two or more selected from the group consisting of polyetherimide, polyarylate and polyamideimide having a miscibility region with the polyfunctional unsaturated imide as well as a number-average molecular weight of more than 10,000.

Further, in the thermoset product obtained by curing the thermosetting polyimide composition according to the present invention, a composition in which polyimide is the main component and a further composition in which the thermoplastic resin is the main component are present in separated phases which are forming a mutually sequentially and regularly entangling structure.

In the manufacturing process for the foregoing thermoset product according to the present invention, further, the foregoing thermosetting polyimide composition is employed as a raw material, the poly-unsaturated imide and thermoplastic resin contained therein are miscibilized so that one phase of the composition mainly of polyimide and the other phase of the composition mainly of the thermoplastic resin will be mutually separated, and the thermoset product providing the structure in which both of the compositions in the separated phase are mutually sequentially and regularly entangling is obtained.

For the poly-unsaturated imide represented by the foregoing formula (1) (which shall be hereinafter referred to simply as "poly-unsaturated imide"), followings are enumerated just as examples and not for specifically limiting thereto:

N,N'-ethylene-bis-imide maleate,
N,N'-hexamithylene-bis-imide maleate,
N,N'-metha-phenylene-bis-imide maleate,
N,N'-para-phenylene-bis-imide maleate,
N,N'-4,4'-diphenylmethane-bis-imide maleate [represented by the foregoing formula (2) and also known as N,N'-methylene-bis(N-phenylmalemimide)],
N,N'-4,4'-diphenylether-bis-imide maleate,
N,N'-4,4'-dicyclohexylmethane-bis-imide maleate,
N,N'-α,α'-4,4'-dimethylenecyclohexane-bis-imide maleate,
N, N'-methaxylene-bis-imide maleate,
N, N'-diphenylcyclohexane-bis-imide maleate
and the like. They are the poly-unsaturated imide obtained by rendering anhydrous maleic acid to react to one of various diamines to produce an amic acid, and thereafter subjecting this amic acid to a reaction of anhydrous ring closure, while it is also possible to employ a poly-unsaturated imide obtained by employing, instead of anhydrous maleic acid, such other acid anhydride as anhydrous citraconic acid, anhydrous itaconic acid, tetrahydrophthalic anhydride, nadic anhydride, their halogenated substitution products, their alkyl substitution products or the like. For other examples of the poly-unsaturated imide, further materials represented by following formulas (3) to (5) may be enumerated:

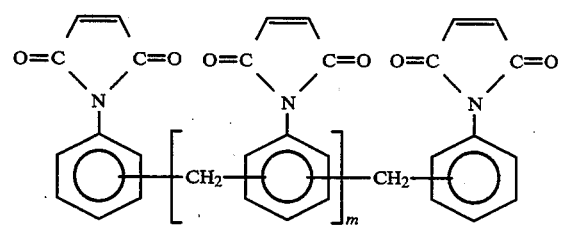
(3)

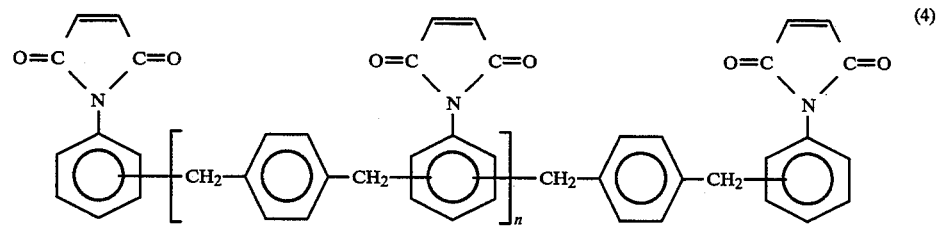
(4)

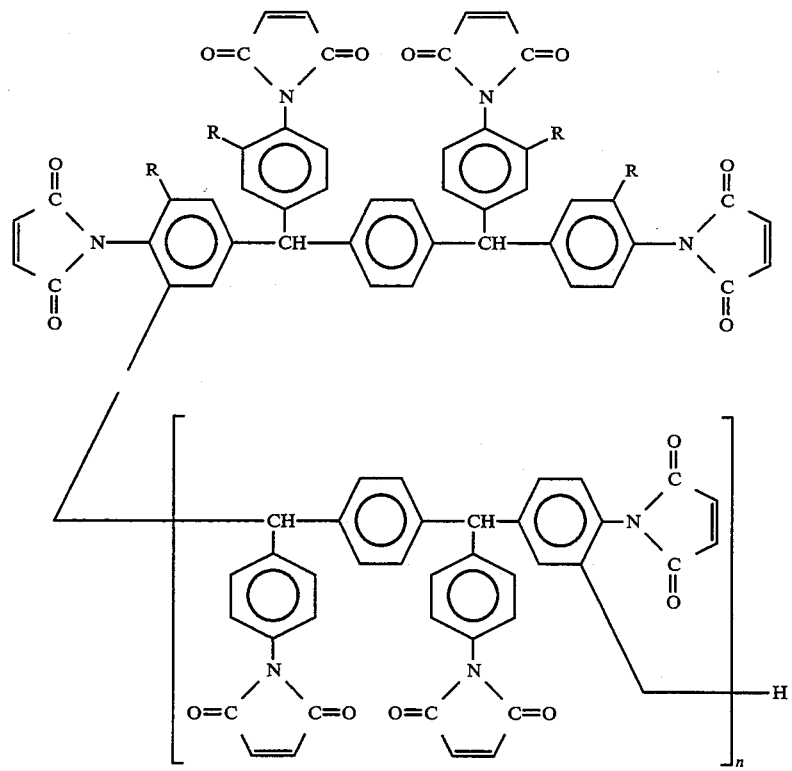

(5)

In these formulas (3) to (5), "m" and "n" respectively represent a positive integer.

It is possible to employ only one or concurrently two or more of these poly-unsaturated imides. As occasion arises, it is also possible to employ, concurrently with the above poly-unsaturated imide, some other thermosetting resin than the poly-unsaturated imides. For such thermosetting resin other than the poly-unsaturated imides, it is possible to employ epoxy resin and the like, while not required to be specifically limited thereto, so long as the same satisfies the object of the present invention. In that event, the poly-unsaturated imide should preferably be of a content more than 35 weight % with respect to the whole of the thermosetting resin component. When the content of poly-unsaturated imide is below this level, it is impossible to reach a satisfiable level of the heat resistance.

Further, the thermosetting polyimide composition according to the present invention may include a cross-linking agent, if desired. For the crosslinking agent, while not required to be specifically limited, there may be enumerated such polyamines as represented by a following formula (6), such (poly)cyanate-ester compounds as represented by a following formula (7), such polyfunctional unsaturated compounds as represented by a following formula (8), such poly-unsaturated compounds as represented by a following formula (9), and so on:

$$R^2\text{+}NH_2]_{x_2} \tag{6}$$

in which "$R^2$" denotes an $x_2$-valent organic group, and "$x_2$" indicates an integer of more than 1.

$$R^3\text{+}O\text{—}C\equiv N]_{x_3} \tag{7}$$

in which "$R^3$" denotes an $x_3$-valent organic group and having at least one aromatic ring, and "$x_3$" indicates an integer of more than 1.

$$[R^4\text{—}CH\text{=}CH]_{x_4}\text{—}R^5 \tag{8}$$

in which "$R^4$" denotes a H or $CH_3$ group, "$R^5$" represents an $x_4$-valent organic group and having at least one aromatic ring, and "$x_4$" indicates an integer of more than 1.

$$[CH_2\text{=}CH\text{—}R^6]_{x_5}\text{—}R^7 \tag{9}$$

in which "$R^6$" denotes a —$CH_2$— group or —$CH_2$—O— group, "$R^7$" denoted an $x_5$-valent organic group and having at least one ring selected from the group consisting of aromatic ring and triazine ring, and "$x_5$" indicates an integer of more than 1.

Any one of these crosslinking agents described above is to attain the crosslinking upon reaction to the carbon-carbon double bonding within the poly-unsaturated imide, and they may be employed respectively alone or in a mixture of two or more.

For polyamines represented by the formula (6), while not required to be limited thereto, there may be enumerated:
4,4'-diaminodicyclohexylmethane,
1,4-diaminocyclohexane,
2,6-diaminopyridine,
m-phenylenediamine,
p-phenylenediamine, 4,4'-diaminodiphenylmethane,
2,2-bis-(4-aminophenyl)propane,
benzidine,
4,4'-diaminophenyl oxide,
4,4'-diaminodiphenyl sulfide,
4,4'-diaminodiphenyl sulfone,
bis-(4-aminophenyl)diphenylsilane, m-xylylenediamine,
p-xylylenediamine,
1,1-bis-(p-aminophenyl)phthalane,
hexamethylenediamine,
and polyamines represented by following formulas (10) and (11), which polyamines may be employed respectively alone or in a mixture of two or more:

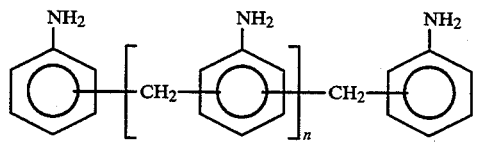

(10)

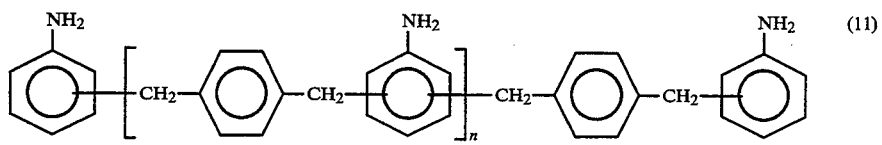

(11)

bis-(4-aminophenyl)methylphosphine oxide,
bis-(3-aminophenyl)methylphosphine oxide,
bis-(4-aminophenyl)phenylphosphine oxide,
bis-(4-aminophenyl)phenylamine,
1,5-diaminonaphthalene, in both of which "n" denotes a positive integer.

For the (poly)cyanate-ester compounds represented by the above formula (7), while not required to be limited specifically, it may be possible to enumerate such ones as represented by following formulas (12) to (26):

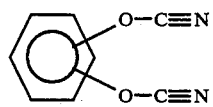

(12)

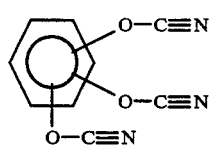

(13)

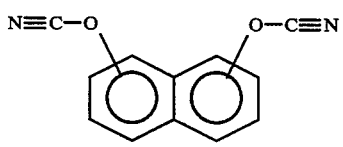

(14)

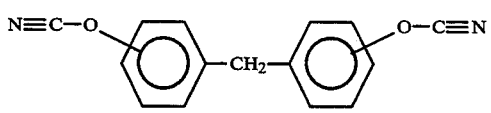

(15)

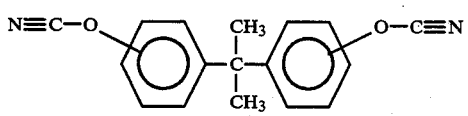

(16)

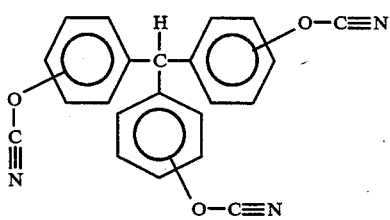

(17)

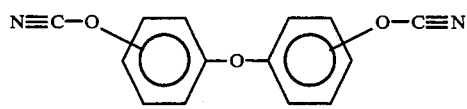 (18)

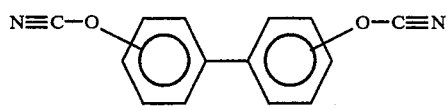 (19)

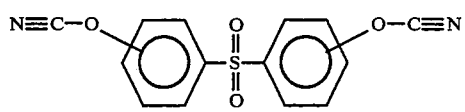 (20)

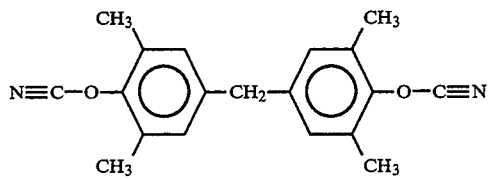 (21)

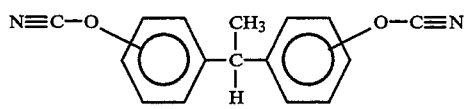 (22)

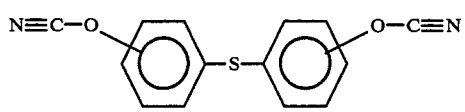 (23)

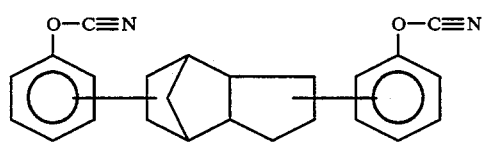 (24)

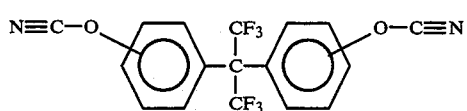 (25)

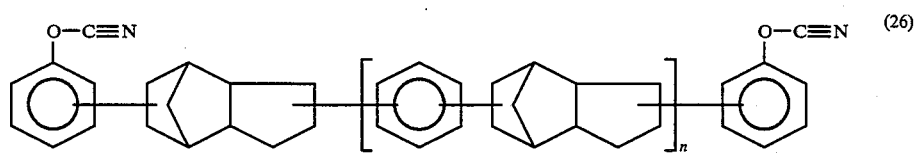 (26)

In the above formula (26), "n" denotes a positive integer.

Of course, the (poly)cyanate-ester compounds are not required to be limited to the ones as in the above, and it is possible to employ any such compounds similar to the ones in the above as those having more functional group, the alkyl substitution products or the like. The (poly)cyanate-ester compounds may be employed respectively alone or in a mixture of two or more.

For the poly-unsaturated compounds represented by the foregoing formula (8), while not required to be specifically limited, there may be enumerated such ones as represented by following formulas (27) to (32), which compounds may be employed respectively alone or in a mixture of two or more:

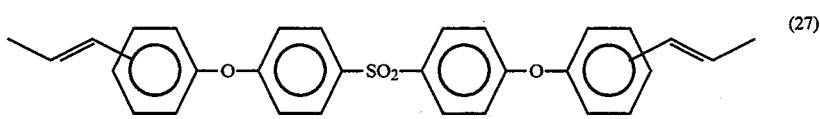 (27)

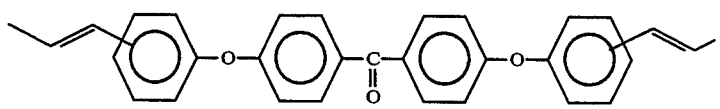
(28)

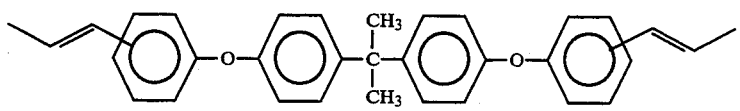
(29)

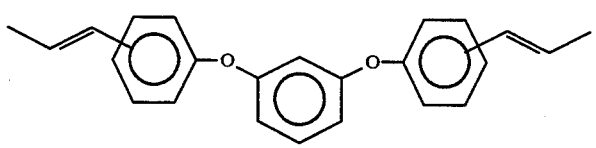
(30)

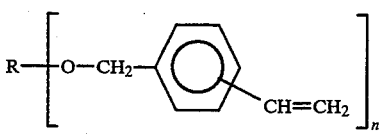
(31)

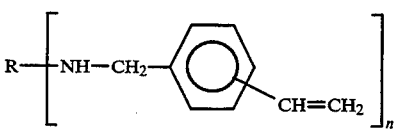
(32)

in which formulas (31) and (32) "n" indicates an integer of more than 2.

For the poly-unsaturated compound represented by the above formula (9), while not required to be specifically limited, there may be enumerated such compounds as represented by following formulas (33) to (36), such allyl-etherified O-cresol-novolak as represented by a following formula (37), such allyl-etherified novolak as represented by a following formula (38), such allylated phenolnovolak as represented by a following formula (39), such poly-allylated phenol as represented by a following formula (40), such o,o'-diallyl-bisphenol A as represented by a following formula (41), such allyl-etherified bisphenol A as represented by a following formula (42), such triallyl isocyanurate (known as TAIC) as represented by a following formula (43), such triallyl trimellirate (TAT) as represented by a following formula (44), and such diallyl phthalate (DAP) as represented by a following formula (45), which compounds may be employed respectively alone or in a mixture of two or more:

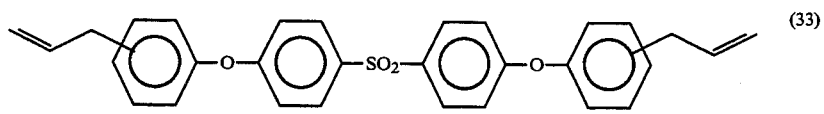
(33)

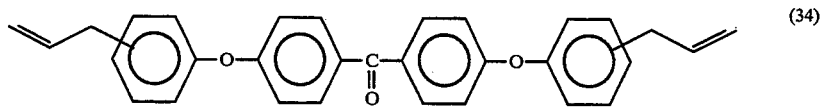
(34)

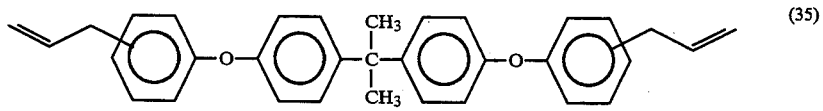
(35)

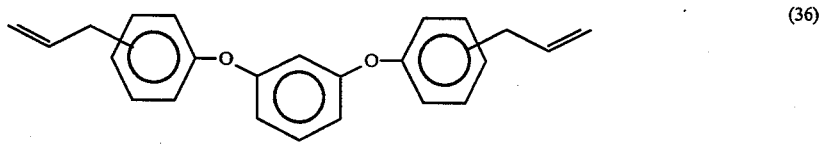
(36)

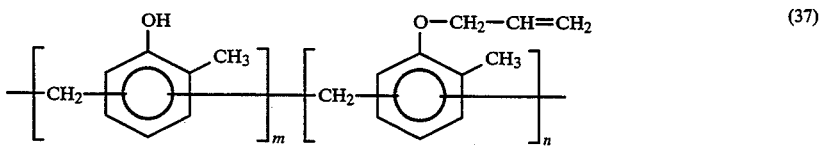
(37)

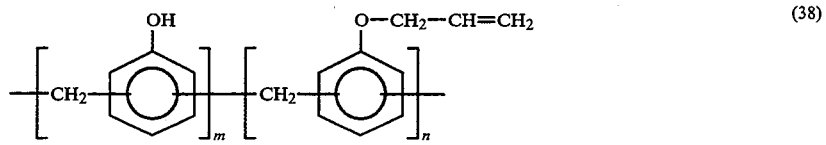     (38)
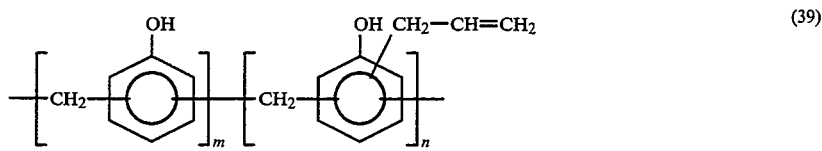     (39)
in which formulas (37) to (39) "m" denotes a positive integer, and "n" denotes an integer of more than two.
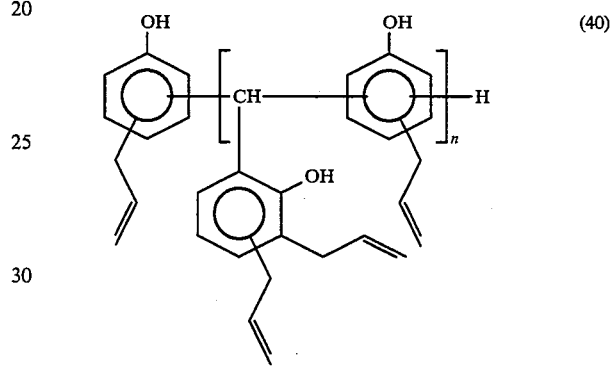     (40)
in which formula (40) "n" denotes a positive integer.
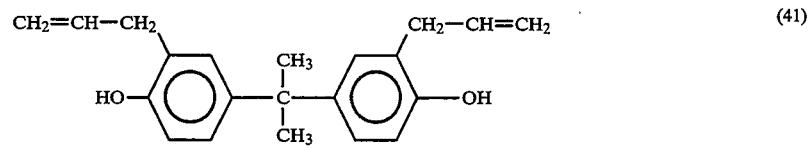     (41)
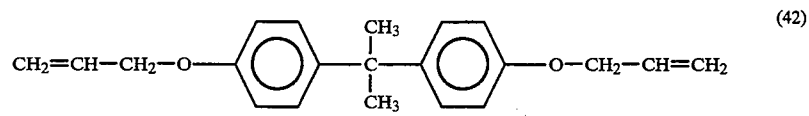     (42)
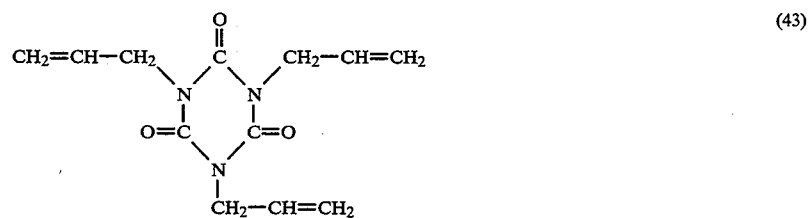     (43)
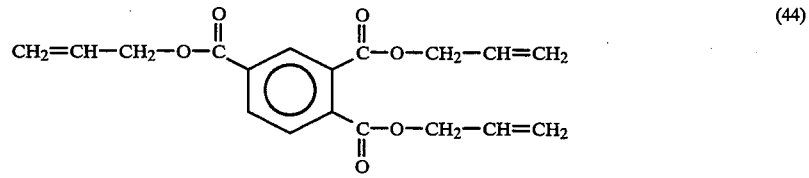     (44)

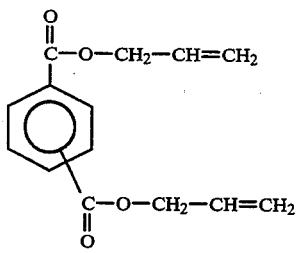
(45)

Further, the thermoplastic resin employed in the present invention is at least one selected from the group consisting of polyetherimide, polyarylate and polyamide imide, which are in a miscibility region with the poly-unsaturated imide, and have a glass transition temperature (Tg) above 180° C. and a number-average molecular weight of more than 10,000. Since the thermoplastic resin is in the miscibility region with the poly-unsaturated imide, it is made possible to miscibilize these thermoplastic resin and poly-unsaturated imide with the temperature and composition properly selected. For the employed thermoplastic resin in the present instance, while not required to be specifically limited, there may be enumerated such polyetherimide as represented by a following formula (46), such polyarylate as represented by a following formula (47), such polyamideimide as represented by a following formula (48) and the like:

set product to be excellent, it is preferable to set these numbers in a range of 30 to 1,000 and, more desirably, 50 to 300.

In respect of the composition ratio of the thermoplastic resin in the present instance, while not required to be specifically limited, it is preferable that, with respect to 100 parts by weight of poly-unsaturated imide, for example, the thermoplastic resin is preferably in a range of 5 to 100 parts by weight and, more desirably, 10 to 50 parts by weight. In an event where the composition ratio of thermoplastic resin is outside this range, it becomes difficult to control the phase-separated structure.

In employing polyamine represented by the foregoing formula (6), it is preferable that the composition ratio of the poly-unsaturated imide (r1: equivalent weight of unsaturated imide group) and polyamine (r2: equivalent weight of amino group) is within a range of more than 1.2 in the ratio of equivalent weight (r1/r2).

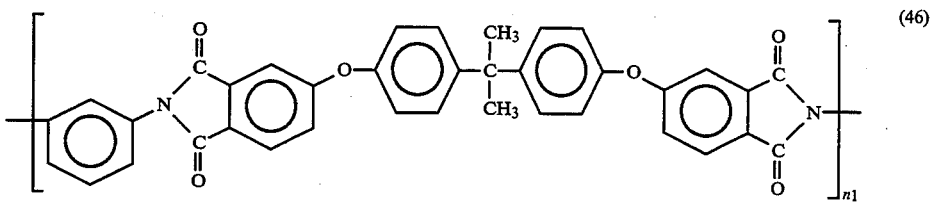
(46)

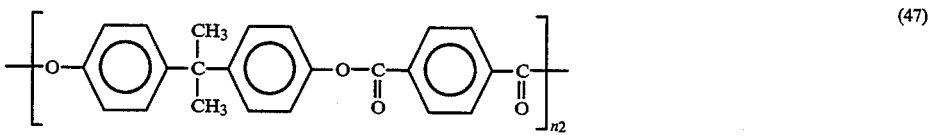
(47)

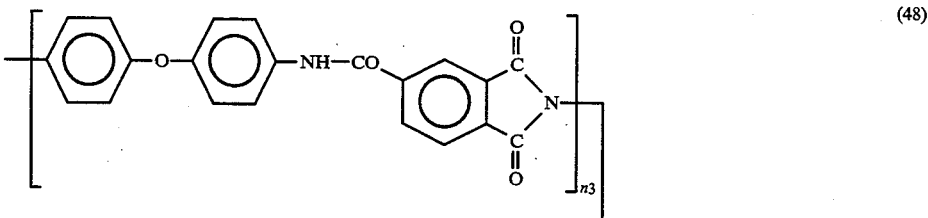
(48)

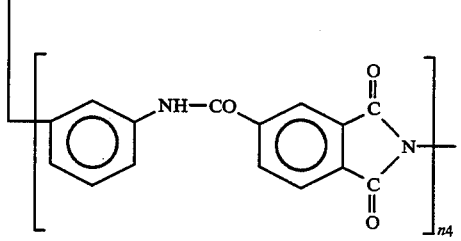

In the above formulas (46) to (48), their repeating numbers n1 to n4 may be respectively a positive integer but, in order to render their miscibility with the poly-unsaturated imide and the heat resistance of the thermo- Provided that their composition ratio becomes below this range (i.e., the amount of polyamine becomes excessive), the required curing time becomes shorter so that the phase-separated structure cannot be effectively formed, upon which, as will be readily appreciated, the toughness and so on cannot be increased sufficiently, and the molding for the thermoset product also becomes difficult.

It is possible to employ the poly-unsaturated imide and polyamine in an aspect of single monomer, respectively, or in their prepolymerized state attained through their reaction preliminarily within a polar solvent. In carrying such prepolymerizing reaction preliminarily, it is preferable that the same is carried out at a temperature within a range of 60°–90° C. in order to prevent any production of homopolymer of the poly-unsaturated imide. It is not preferable that this polymerizing reaction is carried out for a long time because the obtainable prepolymer becomes excessive in the molecular weight so that its miscibility with the thermoplastic resin has to be deteriorated. In this respect, the reaction should preferably be terminated in a state where the component of a molecular weight exceeds 10,000 is below 10%.

When the (poly)cyanate-ester compound represented by the foregoing formula (7) is employed as the crosslinking agent, it is preferable that the composition ratio of the poly-unsaturated imide (r1: equivalent weight of unsaturated imide group) and the ester polycyanate compound (r3: equivalent weight of cyanate group) will be within a range of more than 0.5 in their equivalent weight ratio (r1/r3). Provided that their composition ratio becomes smaller than this range (i.e., the amount of (poly)cyanate-ester compound becomes excessive), it becomes difficult to attain the effective phase-separated structure, the glass transition temperature Tg of the basic thermoset product is raised lower, and the heat resistance, has to be deteriorated.

In employing such polyfunctional unsaturated compounds as represented by the foregoing formulas (8) and (9) as the crosslinking agent, their composition ratio should preferably be such that, while not required to be specifically limited, the poly-unsaturated imide (r1: equivalent weight of unsaturated imide group) and crosslinking agent (r4: equivalent weight of unsaturated group in the poly-unsaturated compound) are of an equivalent weight ratio (r1/r4) in a range of 0.1 to 10 or, more desirably, 0.25 to 1. Provided that the ratio is less than 0.1, the addition of the crosslinking agent is no more effective and, when the ratio exceeds 10, the thermoset product is deteriorated in the heat resistance.

The thermosetting polyimide composition according to the present invention may contain, as occasion demands, a catalyst for promoting its curing reaction. For the catalyst employable, while not specifically limited, enumerated materials will be such tertiary amines or imidazoles and their ammonium salts as organic base: N,N-dimethylaniline, N-N-dimethyltoluidine, N,N-dimethyl-p-anisidine, p-halogen-N,N-dimethylaniline, 2-N-ethylanilinoethanol, tri-n-butylamine, piridine, quinoline, N-methylmorpholine, triethanolamine, benzilidimethylamine 2-undecylimidazole, 2-ethyl-4-methylimidazole, and benzimidazoles;

such phosphorous compounds as triphenylphosphines;

such phenols as phenol, cresol, xylenol, resolcinol and phloroglucinol;

such organic metal salts as lead naphthenate, lead stearate, zinc naphthenate, stannous oleate, dibutyl-tin maleate, manganese naphthenate and cobalt naphthenate;

such chlorides as $SnCl_2$, $ZnCl_2$ and $AlCl_3$;

such ionic catalysts as alkali metal compounds;

such radical catalysts of organic peroxides and the like as azobisisobutyronitrile and dicumyl peroxide; and acetylacetonato and its transition-metal catalysts.

While the amount in which one of these catalysts is used should largely vary in accordance with the type of catalyst employed, the use of the thermoset product, curing conditions and so on and cannot be generally defined, it is preferable to select a catalyst amount in general sense, for example, less than 5 weight % with respect to the thermosetting resin component.

In an event where a curing temperature of any setting system resin selected attains only a slow curing speed so that the phase separation cannot be well executed so as to cause the phase-separated structure in the thermoset product to be coarse or irregular, on the other hand, a cure accelerator may be added. While this cure accelerator acts as means for adjusting the curing speed so as to realize a well balanced phase separation as the cure advances, the use of the same is not essential for the present invention.

Further, the thermosetting polyimide composition according to the present invention may include, as occasion demands, such various additives as die lubricant, pigment and the like, fillers and so on. Further, the composition can be molded for use in SMC, FRP and so on in an aspect of prepregs of such base glass cloth or the like impregnated with the composition in the form of warnish as dissolved in a solvent.

Next, references shall be made to the principle of formation of the phase-separated structure in the thermosetting product of the present invention, as well as means for confirming this phase-separated structure. In an event where two different organic substances A and B are mixed, in general, it is possible to prepare a graph which is called "phase diagram" in respect of the composition ratio of these substances and treating temperature. There arise various cases where the miscibility state is attained between both substances in all utility zones, no miscibility state is attained in all utility zones, and they are miscible in a certain zone but show a phase-separated state in some other zone. Which phenomenon takes place is determined by whether the free energy in the miscible state is lower than a total free energy in the immiscible two phase state, that is, which compositional dependency $\Delta G_{mix}$ will have.

Figure 25:
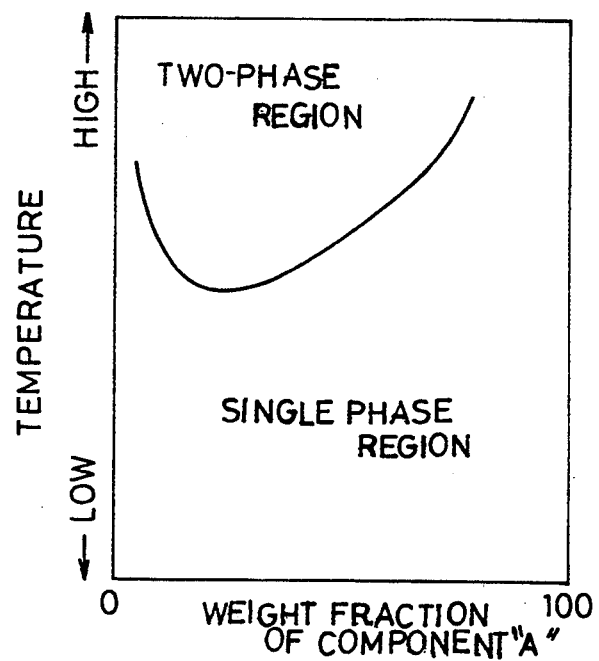
FIG. 25 is a phase diagram of LCST (lower critical solution temperature) type, showing the correlation between the composition of a system and the temperature, which system being of components forming a homogeneous solution at low temperatures to be in a miscible state but separating into two phases at higher temperatures.
Figure 26:
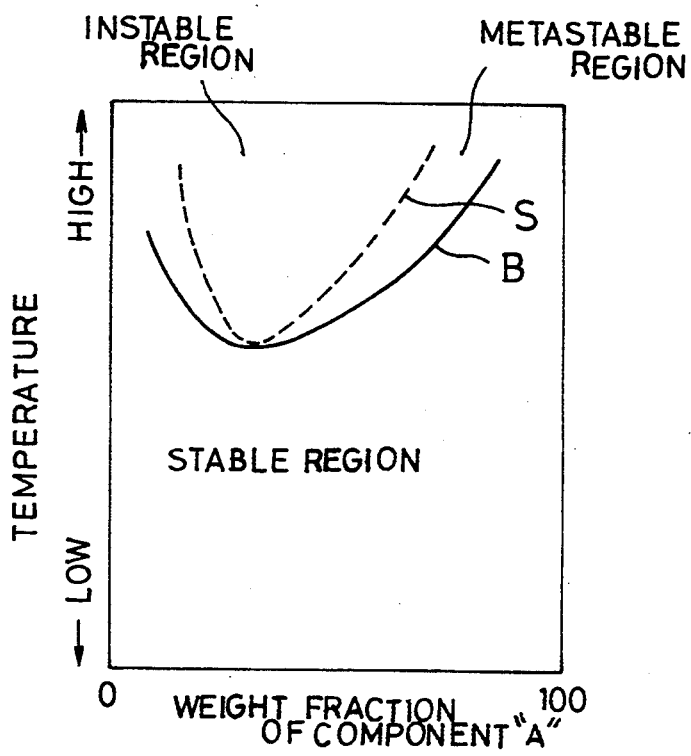
FIG. 26 is a diagram showing a binodal curve as well as a spinodal curve presented in the LCST type phase diagram.

In FIG. 25, there is shown an example of the "phase diagram" which is of a so-called LCST type, and it will be appreciated-that the miscibility is easily shown on lower temperature side so long as the composition is the same. On the other hand, there is a case in which the miscibility is seen on higher temperature side, a phase diagram of which is drawn is a so-called UCST (upper critical solution temperature) type. Here, a curve seen in the phase diagram to distinguish an immiscibility (two-phase) region from a miscibility (single phase) region is called a binodal curve B as shown in FIG. 26. Further, as shown also in FIG. 26, it is possible to draw another broken line curve, i.e., a spinodal curve S disposed on the immiscibility region side while having a peak point disposed to be on the binodal curve B, by connecting respective dots of $\partial^2 \Delta G_{mix}/\partial \phi^2 = 0$. On inner side of this spinodal curve S, $\partial^2 \Delta G_{mix}/\partial \phi^2 < 0$ and, on outer side, $\partial^2 \Delta G_{mix}/\partial \phi^2 > 0$. In the immiscibility region here, the inner side of the spinodal curve is referred to as an instable region, whereas a region disposed between the spinodal curve S and the binodal curve B is referred to as a metastable region.

Figure 27:
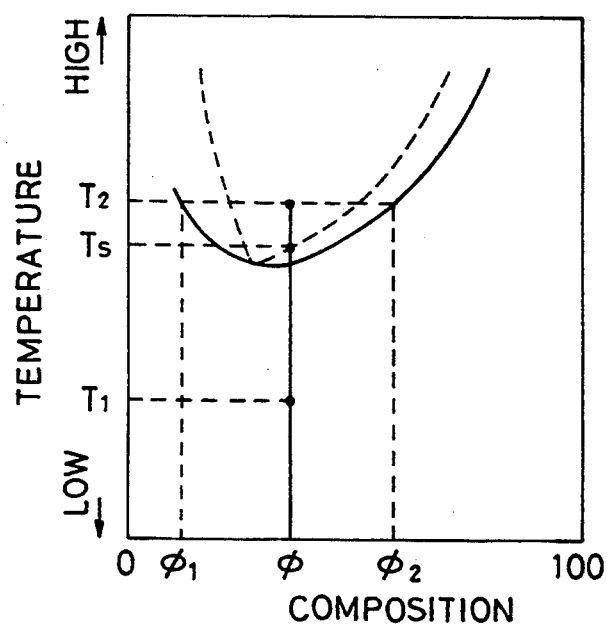
FIG. 27 is an explanatory diagram for a process of phase separation occurring when the mixture system in the homogeneous miscible state is subjected to an abrupt temperature rise, with the LCST type phase diagram utilized.
Figure 28:
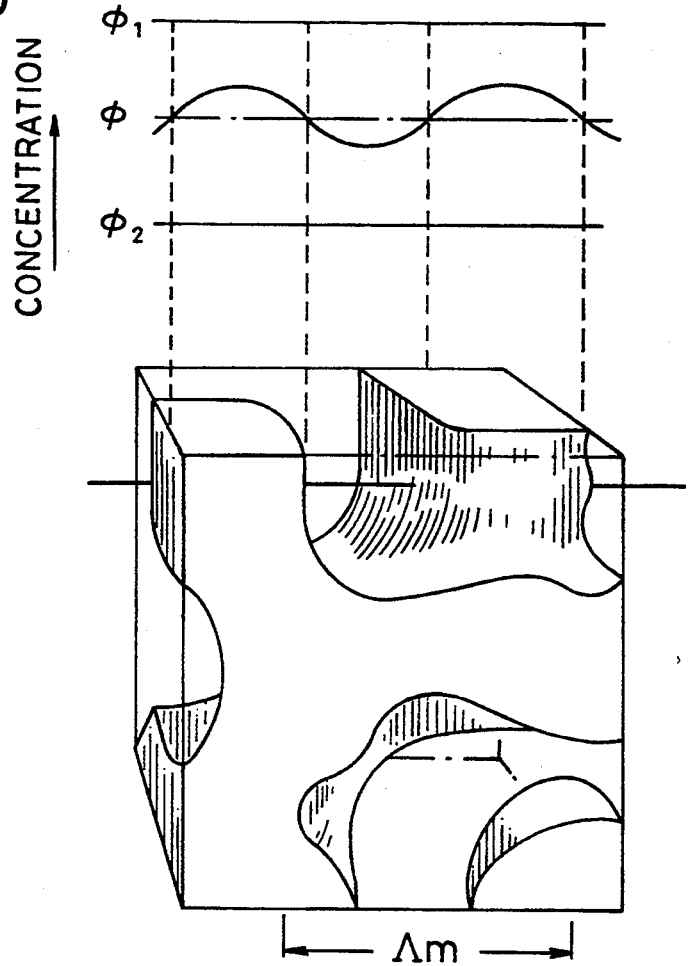
FIG. 28 is a diagram for schematically showing a three-dimensionally modulated structure having the periodic distance $\Lambda m$ and its fluctuation in the concentration.

More specifically, the phase separation quickly starts occurring in coexisting compositions $\phi_1$ and $\phi_2$ when the temperature of a mixture system in homogeneously miscible state within the stable miscibility region at a temperature $T_1$ is abruptly raised to a temperature $T_2$ so as to be within the instable region, as shown in FIG. 27. At this time, as shown in FIG. 28, there is formed a structure in which both of the separated phases are mutually entangling sequentially and regularly at a wavelength $\Lambda m$ (periodic distance) of a constant concentration, which structure is referred to as a "modurated structure", the periodic distance $\Lambda m$ of this modified structure being imaginable thermodynamically through a following formula (49) by means of positions $(\phi, T_2)$ in the phase diagram:

$$\Lambda m \approx 2\pi L[3|T_S - T_2|/T_S]^{-\frac{1}{2}} \qquad (49)$$

wherein "L" is an interaction distance between moleculars which is made to be about 30 nm in general.

Figure 29:
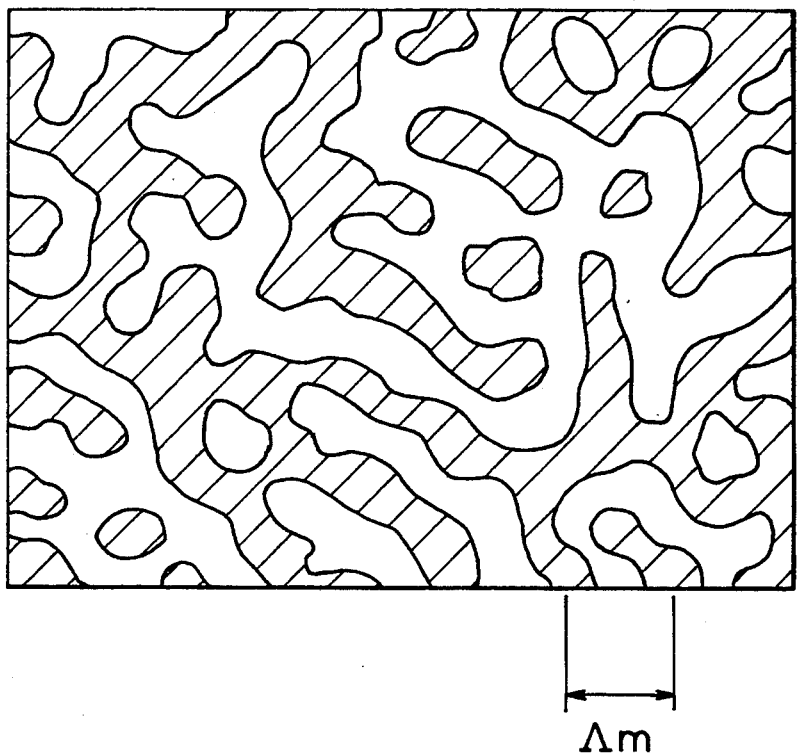
FIG. 29 is a diagram for schematically showing a two-dimensionally modulated structure having the periodic distance $\Lambda m$.

It has been revealed by an electronic computer simulation that, in two dimensional microscopic observation, the modurated structure shows such coralliform entangling pattern as shown in FIG. 29. In practice, it has been confirmed that such structure is attained in various systems.

Normally, this state is of a phenomenon at initial stage of spinodal decomposition, at terminating stage of which a structural enlargement takes place while the pattern itself remains similar, and eventually the pattern of FIG. 29 shifts to a domain structure. In order to have the mutual sequential structure due to the spinodal decomposition fixed, a fixation of one or both of the compositions in a short period by means of a rapid cooling or the like is effective, but the pattern is caused to also shift to the domain structure when the temperature is raised again, so as to become poor in the utility.

In this connection, it has been revealed recently that, in the case where one of the two different organic substances in the mixture is a thermosetting component, the thermosetting phase is prevented by the reaction from free movement at the initial stage of the spinodal decomposition, so that a permanent structural fixation will take place. For example, a thesis "Structure development in epoxy resin modified with poly(ether sulphone)" by Keizo Yamanaka et al in POLYMER, 1989, Vol. 30, April, Pages 662–667, discloses an example of the fixation of modurated structure of an epoxy resin employed as the thermosetting resin along with the thermoplastic resin.

A remarkable feature of the present invention resides in the composition and its thermoset product, the composition consisting as essential components of the poly-unsaturated imide and the specific thermoplastic resin, and providing the modurated structure from the phase separation of these poly-unsaturated imide and thermoplastic resin upon the curing, that is, the structure in which the two separated phases of the two resins are mutually entangling sequentially and regularly. This structure of the two separated phases mutually entangling sequentially and regularly (which shall be hereinafter referred to simply as "periodic structure") can be confirmed through such two measures as follows:

a) With a light scattering measurement employed, and with the scattering maximum perceived as periodically appearing, the periodic distance $\Lambda m$ is calculated by means of a following formula (50) employing an irradiated light wavelength $\lambda$ for the light scattering, a refractive index N of the thermoset product and a scattering angle $\theta m$ providing the scattering maximum:

$$\Lambda m = (\lambda/2N)/\sin(\theta m/2) \qquad (50)$$

Normally, it is preferable that the periodic distance $\Lambda m$ in an event where the modurated structure of the spinodal decomposition is in a range of 0.01 to 10 μm because a value exceeding 10 μm causes the foregoing structural enlargement showing the domain structure to occur.

b) Presence or absence of such pattern as in FIG. 29 is observed through a light microscope.

Other than the above measures a) and b), it will be also possible to confirm the structure through c) an observation of complete miscibilization before or during curing of the composition once, and d) an observation of the coralloidal structure with remaining imide phase made to entangle therein upon etching of the surface of the thermoset product by a solvent to which the thermoplastic resin is soluble.

Now, in the manufacturing process for the thermoset product according to the present invention, while not specifically limited, it is preferable that the two.-different organic substances are once miscibilized and, when powdery substances are to be mixed, for example, they should be desirably kept heated until their miscibilized state is reached at a temperature not enough for the curing. When, on the other hand, such casting process that mixes the two substances homogeneously in the order of molecule with a common solvent and thereafter dissolves them together, a homogeneous miscibilization can be attained in a moment within the miscibility region, and the product is not subjected to any restriction of manufacturing conditions and so on. Further, the curing speed is adjustable with, for example, an adjustment of curing temperature, an addition of the curing accelerator, and so on. In this case, the adjustment of curing speed acts as means for controlling the periodic distance of the phase separation.

It is important that, within the scope of the present invention, conditions for forming the thermoset product are selected so that both separated phases of the phase mainly of polyimide and the phase mainly of the thermoplastic resin can attain the mutually sequential structure. In forming the thermoset product, different results will take place in accordance with the composition and so on of the curing system resin, and no specific limitation is made.

In forming the thermoset product, one or more of such polar solvents as methylene chloride, N,N'-dimethylacetamide, dimethyl sulfoxide, N-methylpirrolidone, N,N'-dimethylformamide, methyl cellosolve (2-methoxyethanol) and so on is employed to mix and dissolve the whole components, and a solution of a concentration 5 to 60 weight % is regulated. Thus obtained solution is made into a casting film, and the solvent is removed. Then the obtained film is cured at a temperature in a range of 140° to 250° C. for 1 to 5 hours so as to fix the structure. Then, the film should desirably be cured at 200° to 300° C. for 1 to 6 hours for promotion of the structural fixation.

In preparing a film shape molded product, a non-cured casting film may be subjected to grind a coarse powder and thereafter to the molding and curing. It will be also possible to admix the powdery substances without using any solvent, to leave this mixture at a miscibilizing temperature in a range of, for example, 70° to 150° C. to have the substances miscibilized, and thereafter to heat them at a molding temperature.

The thermoset product formed in the above manner is provided concurrently with a high heat resistance brought about by the employed polyimide and with such mechanical characteristics as the toughness, flexibility, adhesion and so on brought about by the thermoplastic resin employed.

For other thermoplastic resin than polyether imde, polyarylate and polyamideimide, there may be enumerated such ones as polyphenylene oxide (PPO), polyvinylidene fluoride (PVDF), polyetheretherketone (PEEK), polyphenylene sulfide (PPS), polyacetal (POM), nylon, polycarbonate (PC), and the like, but these thermoplastic resins cannot be used in the present invention, because they are not suitable in respect of the heat resistance, employable solvent or miscibility region. For example, polyphenylene oxide and polyvinylidene fluoride have no miscibility region with the polyfunctional unsaturated imide. Polyether- etherketone and polyphenylene sulfide involve difficulty in selecting a preferable solvent. Polyacetal and nylon also involve the difficulty in selecting the preferable solvent and further difficulty in causing the heat resistance deteriorated due to their glass transition temperature lower than 180° C. While polycarbonate has the miscibility region with the poly-unsaturated imide, it also causes the heat resistance deteriorated due to the glass transition temperature lower than 180° C.

Description shall be made in the followings with respect to practical examples of the present invention and comparative examples.

EXAMPLE 1

100 parts by weight of N,N'-methylene-bis(N-phenyl maleimide) (manufactured by Mitsui Toatsu Kagaku K.K., BMI-S) such as represented by the foregoing formula (2), 30 parts by weight of polyether imide ("ULTEM" in trademark by GE plastics, 1000, a glass transition temperature Tg of 217° C., number-average molecular weight of 12,000 and weight-average molecular weight of 30,000) and 27.7 parts by weight of 4,4'-diaminodiphenylmethane (a reagent by Tokyo Kasei K.K.) were blended to be a solution of 10 weight % methylene chloride. This solution was cast over a cover glass, the solvent was removed at room temperatures for 24 hours and under a reduced pressure, and a thin film was obtained.

This thin film was cured at 150° C. and was then subjected to measurement of light scattering sequentially with time and to observation with light microscope. The light scattering measurement was executed by measuring the light scattering of the cast film at intervals of 30 seconds by means of a device GP-5 manufactured by OPTEK K.K. (Tokyo, Japan) (commonly throughout the following Examples).

The light scattering measurement has revealed in its profile the scattering maximum, and this proves that obtained sample of Example 1 has a regular phase-separated structure of a certain periodic distance (also commonly throughout the following Examples).

EXAMPLE 2

In Example 1, only the curing temperature was changed to 170° C. to cure the cast thin film, which was used as a sample for the light scattering measurement.

EXAMPLE 3

In Example 1, only the curing temperature was altered to 200° C. to cure the cast thin film, which was used as a sample for the light scattering measurement.

In FIG. 1, results of observation of variation with time in the periodic distance $\Lambda m$ obtained from angles denoting the scattering maximum of the cured samples in the foregoing Examples 1 to 3 are concurrently shown. As will be clear from FIG. 1, it has been found that the phase-separated structure becomes larger with time in all of the samples and is fixed after the passage of certain time.

Figure 2:
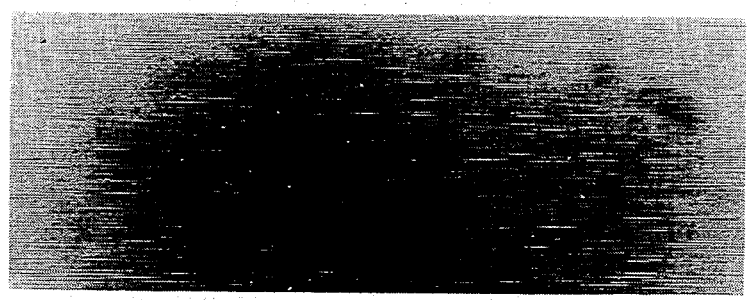
FIG. 2 is a light micrograph showing a phase-separated structure in a finally cured sample cured at 150° C. in Example 1.
Figure 3:
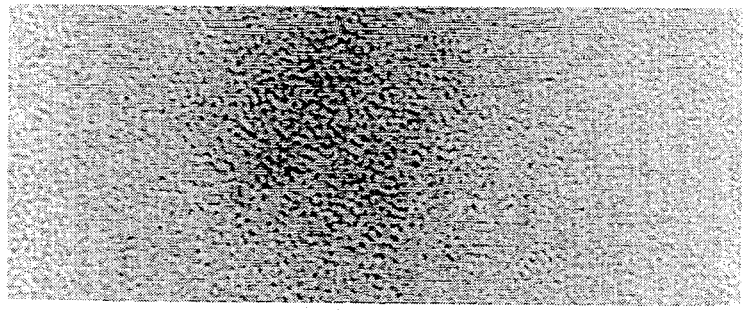
FIG. 3 is a light micrograph showing a phase-separated structure in a finally cured sample cured at 170° C. in Example 2.
Figure 4:
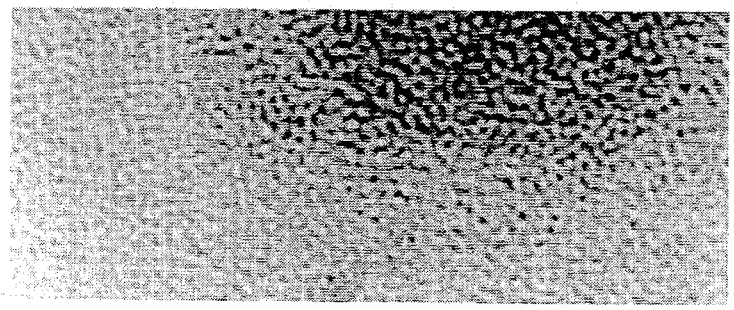
FIG. 4 is a light micrograph showing a phase-separated structure in a finally cured sample cured at 200° C. in Example 3.

In FIGS. 2 to 4, there are shown light micrographs of the phase-separated structure of the respective samples in the finally cured state of Examples 1 to 3, in which the length of 12 mm corresponds to a practical length of 20 $\mu m$ (magnifying power of 600). As will be clear from these drawings, the periodic structures corresponding to the results in the light scattering shown in FIG. 1 have been observed.

Figure 5:
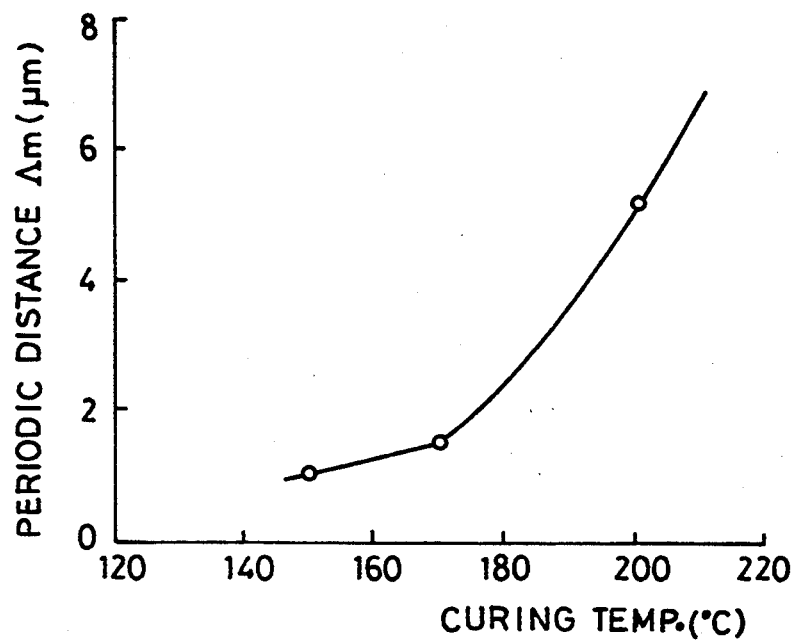
FIG. 5 is a graphical showing of the relationship between the periodic distance $\Lambda m$ and the curing temperature in the finally cured samples in Examples 1 to 3.

In FIG. 5, there is shown the relationship between the periodic distance $\Lambda m$ and the curing temperature of the finally cured samples of Exmaples 1 to 3. As will be clear from this drawing, it has been found that the periodic distance $\Lambda m$ is enlarged as the curing temperature rises.

Figure 6:
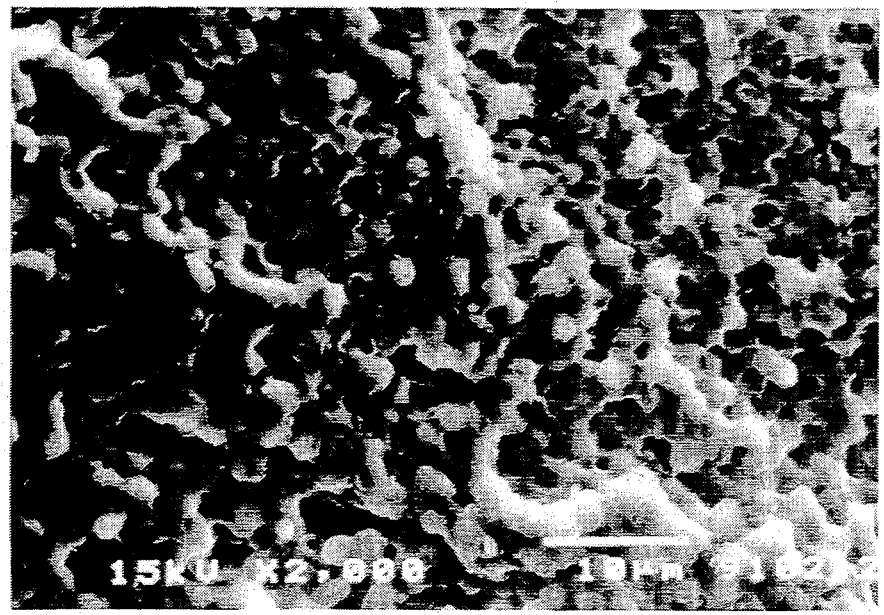
FIG. 6 is a scanning type electron micrograph showing a particle structure at a rupture cross-section etched with a solvent of the finally cured sample in Example 2.

Further, the finally cured sample of Example 2 was subjected to complete cooling with liquid nitrogen and then to a fracture. With respect to a rupture cross-section of this sample, an etching was carried out at room temperatures for 24 hours with methylene chloride as a solvent which could easily dissolve polyetherimide, and polyetherimide phase was thereby removed. The thus etched rupture surface of the sample was observed with a scanning type electron microscope (SEM), the result of which was as shown in FIG. 6 with a magnifying power of 200. As would be clear from this drawing, an interconnected particle structure (interconnected-globule structure) could be observed.

EXAMPLE 4

Another thin film was obtained in the same manner as in Example 1, except that 10 weight % solution of N,N'-dimethylformamide (DMF) was prepared with the respective components in Example 1 blended in such composition ratio as shown in a following TABLE I, and that the drying time after the casting of this solution was modified to be 72 hours. The thus obtained thin film was cured at 200° C. and was employed as a sample for the light scattering measurement. The periodic distance in the optimum phase-separated structure was 1.0 $\mu m$.

EXAMPLES 5 TO 9

Other thin films ware obtained in the same manner as in Example 1, except that 10 weight % solution of methylene chloride was obtained with the respective components blended in such composition as shown in the following TABLE I respectively. The thus obtained thin films were cured at 200° C. and were employed as samples for the light scattering measurement. Their periodic distance in the optimum phase-separated structure was as also shown in TABLE I.

EXAMPLE 10

100 parts by weight of N,N'-methylene-bis(N-phenyl-maleimide) represented by the foregoing formula (2) (by Mitsui Toatsu Kagaku K.K., BMI-S) and 30 parts by weight of polyetherimide employed in Example 1 were blended to be a 10 weight % solution of methylene chloride. A thin film obtained with this solution in the same manner as in Example 1 was cured at 170° C. and was used as a sample #or the light scattering measurement. Its periodic distance in the optimum phase-separated structure was as shown in the following TABLE I.

EXAMPLE 11

The curing temperature of the thin film in EXAMPLE 10 was made to be 200° C., and thus cured thin film was employed as a sample for the light scattering measurement. Its periodic distance in the optimum phase-separated structure was as shown in the following TABLE I.

EXAMPLE 12

100 parts by weight of N,N'-methylene-bis(N-phenyl-maleimide) represented by the foregoing formula (2), 30 parts by weight of polyetherimide employed in Example 1 and 52 parts by weight of 2,2-bis(p-cyanato-phenyl)propane (a reagent by Tokyo Kasei K.K.) were blended to be a 10 weight % solution of methylene chloride. A thin film was obtained with this solution in the same manner as in Example 1, and was cured at 140° C. to be employed as a sample for the light scattering measurement. Its periodic distance in the optimum phase-separated structure was as shown in the following TABLE I.

EXAMPLE 13

The curing temperature in Example 12 was made to be 170° C. and thus cured thin film was employed as a sample for the light scattering measurement. Its periodic distance in the optimum phase-separated structure was as shown in the following TABLE I.

EXAMPLE 14

The curing temperature in Example 12 was made to be 200° C., and thus cured thin film was employed as a sample for the light scattering measurement. Its periodic distance in the optimum phase-separated structure was as shown in the following TABLE I.

EXAMPLE 15

A thin film was obtained in the same manner as in Example 1, except that 10 weight % solution of methylene chloride was prepared with the respective components blended in such composition as shown in the following TABLE I. This thin film was cured at 200° C. and was made as a sample for the light scattering measurement. Its periodic distance in the optimum phase-separated structure was also as shown in TABLE I.

EXAMPLE 16

A thin film was obtained in the same manner as in Example 1, except that 10 weight % solution of N,N'-dimethylformamide (DMF) was prepared with the respective components blended in such composition as shown in the following TABLE I, and that the cast solution into the film was dried for 72 hours. This thin film was cured at 200° C. and made as a sample for the light scattering measurement. Its periodic distance in the optimum phase-separated structure was also as shown in TABLE I.

EXAMPLE 17

A thin film was obtained in the same manner as in Example 1, except that 10 weight % solution of methylene chloride was prepared with the respective components blended in such composition as shown in the following TABLE I. This thin film was cured at 200° C. and was made as a sample for the light scattering measurement. Its periodic distance in the optimum phase-separated structure was also as shown in TABLE I.

EXAMPLE 18

A thin film was obtained in the same manner as in Example 1, except that 10 weight % solution of N,N'-dimethylformamide (DMF) was prepared with the respective components blended in such composition as shown in the following TABLE I, and that the cast solution into the film was dried for 72 hours. This thin film was cured at 200° C. and was made as a sample for the light scattering measurement. Its periodic distance in the optimum phase-separated structure was also as shown in TABLE I.

EXAMPLES 19 TO 22

Thin films were obtained in the same manner as in Example 1, except that 10 weight % solutions of methylene chloride were prepared respectively with the components blended in each of such compositions as shown in the following TABLE I. These thin films were cured respectively at each of such temperatures shown in the Table I. Their periodic distances in the optimum phase-separated structure were also as shown in TABLE I.

COMPARATIVE EXAMPLES 1 TO 3

10 weight % solutions of methylene chloride were prepared with the components in such variety of compositions as shown in the following Table I. These solutions were then cast on respectively on a tinplate, and thin films of these solutions were obtained in the same manner as in Example 1. These thin films were cured under such conditions as shown also in TABLE I and were used as samples. The sample of Comparative Example 1 crazed upon the cooling after the curing and was unable to be subjected to the measurement.

TABLE I

| | Composition Ratio (Parts by weight) | | | | | | | | | Thermoplastic Resin | | | Solvnt (wt %) | Cur. Temp. (°C.) | Post Cur. Temp. (°C.) | Perd. Dist. (μm) | Miscibd. (Homogeneous) (°C.) |
|---|---|---|---|---|---|---|---|---|---|---|---|---|---|---|---|---|---|
| | Unsat. Imide | | | | Polyamine | | | | | | | | | | | | |
| | J | K | L | M | O | P | Q | R | S | PEI | PAR | PAI | | | | | |
| Ex. No. | | | | | | | | | | | | | | | | | |
| 1 | 100 | — | — | — | 27.7 | — | — | — | — | 30 | — | — | CH$_2$Cl$_2$ 10 | 150 | 230 | — | 135 |
| 2 | 100 | — | — | — | 27.7 | — | — | — | — | 30 | — | — | CH$_2$Cl$_2$ | 170 | 230 | — | 135 |

TABLE I-continued

| | Composition Ratio (Parts by weight) | | | | | | | | | Thermoplastic Resin | | | Solvnt (wt %) | Cur. Temp. (°C.) | Post Cur. Temp. (°C.) | Perd. Dist. (μm) | Miscibd. (Homogeneous) (°C.) |
|---|---|---|---|---|---|---|---|---|---|---|---|---|---|---|---|---|---|
| | Unsat. Imide | | | | Polyamine | | | | | | | | | | | | |
| | J | K | L | M | O | P | Q | R | S | PEI | PAR | PAI | | | | | |
| 3 | 100 | — | — | — | 27.7 | — | — | — | — | 30 | — | — | CH$_2$Cl$_2$ 10 | 200 | 250 | — | 135 |
| 4 | 100 | — | — | — | — | 34.6 | — | — | — | — | — | 30 | DMF 10 | 200 | 250 | 1.0 | 165 |
| 5 | 100 | — | — | — | — | — | 27.9 | — | — | 30 | — | — | CH$_2$Cl$_2$ 10 | 200 | 250 | 1.7 | 165 |
| 6 | 100 | — | — | — | — | — | — | 27.4 | — | 30 | — | — | CH$_2$Cl$_2$ 10 | 200 | 250 | 2.0 | 165 |
| 7 | — | 100 | — | — | 27.5 | — | — | — | — | 30 | — | — | CH$_2$Cl$_2$ 10 | 200 | 250 | 2.2 | 155 |
| 8 | — | — | 100 | — | 36.9 | — | — | — | — | 30 | — | — | CH$_2$Cl$_2$ 10 | 200 | 250 | 2.5 | 175 |
| 9 | — | — | — | 100 | 15.0 | — | — | — | — | 30 | — | — | CH$_2$Cl$_2$ 10 | 200 | 250 | 4.3 | 105 |
| 10 | 100 | — | — | — | — | — | — | — | 52.0 | 30 | — | — | CH$_2$Cl$_2$ 10 | 170 | 230 | 2.5 | 160 |
| 11 | 100 | — | — | — | — | — | — | — | — | 30 | — | — | CH$_2$Cl$_2$ 10 | 200 | 250 | 3.9 | 160 |
| 12 | 100 | — | — | — | — | — | — | — | 52.0 | 30 | — | — | CH$_2$Cl$_2$ 10 | 140 | 230 | 3.1 | 130 |
| 13 | 100 | — | — | — | — | — | — | — | 52.0 | 30 | — | — | CH$_2$Cl$_2$ 10 | 170 | 230 | 3.6 | 130 |
| 14 | 100 | — | — | — | — | — | — | — | 52.0 | 30 | — | — | CH$_2$Cl$_2$ 10 | 200 | 250 | 4.1 | 130 |
| 15 | 100 | — | — | — | — | — | — | — | — | — | 30 | — | CH$_2$Cl$_2$ 10 | 200 | 250 | 1.5 | 160 |
| 16 | 100 | — | — | — | — | — | — | — | — | — | — | 30 | DMF 10 | 200 | 250 | 1.5 | 160 |
| 17 | 100 | — | — | — | — | — | — | — | 52.0 | — | 30 | — | CH$_2$Cl$_2$ 10 | 200 | 250 | 1.2 | 130 |
| 18 | 100 | — | — | — | — | — | — | — | 52.0 | — | — | 30 | DMF 10 | 200 | 250 | 2.0 | 130 |
| 19 | 100 | — | — | — | 27.7 | — | — | — | — | 15 | — | — | CH$_2$Cl$_2$ 10 | 150 | 250 | 3.8 | 135 |
| 20 | 100 | — | — | — | 27.7 | — | — | — | — | 50 | — | — | CH$_2$Cl$_2$ 10 | 150 | 250 | 0.6 | 135 |
| 21 | 50 | 50 | — | — | 27.6 | — | — | — | — | 30 | — | — | CH$_2$Cl$_2$ 10 | 200 | 250 | 3.2 | 130 |
| 22 | 50 | — | — | 50 | 21.4 | — | — | — | — | 30 | — | — | CH$_2$Cl$_2$ 10 | 200 | 250 | 5.3 | 100 |
| Comp. Ex. | | | | | | | | | | | | | | | | | |
| 1 | 100 | — | — | — | — | — | — | — | — | — | — | — | CH$_2$Cl$_2$ 10 | 170 | 230 | — | — |
| 2 | 100 | — | — | — | 27.7 | — | — | — | — | — | — | — | CH$_2$Cl$_2$ 10 | 170 | 230 | — | — |
| 3 | 100 | — | — | — | — | — | — | — | 52.0 | — | — | — | CH$_2$Cl$_2$ 10 | 170 | 230 | — | — |

In the column of poly-unsaturated imide of the above TABLE I, "J" denote N,N'-methylene-bis(N-phenyl maleimide) represented by the foregoing formula (2), "K" denotes a compound represented by a following formula (51) (by Mitsui Toatsu Kagaku K.K., BMI-DA)

(51)

"L" denotes a compound represented by a following formula (52) (by Mitsui Toatsu Kagaku K.K., BMI-MP)

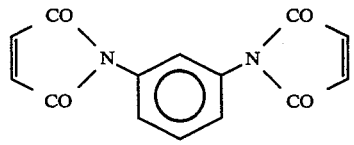

and "M" denotes a compound represented by a following formula (53) (by Mitsui Toatsu Kagaku K.K.)

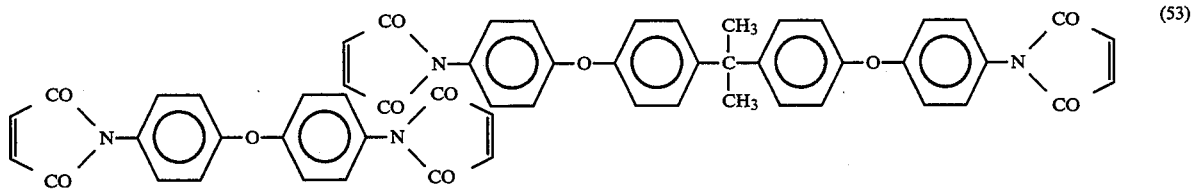

Further in the column of polyamine as the crosslinking agent in the above TABLE I, "O" denotes 4,4'-diaminodiphenylmethane represented by a following formula (54) (a reagent by Tokyo Kasei K.K.)

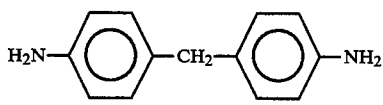

"P" denotes 4,4'-diaminodiphenyl sulfone represented by a following formula (55) (a reagent by Tokyo Kasei K.K.)

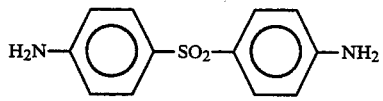

"Q" denotes 4,4'-diaminodiphenyl ether represented by following formula (56) (a reagent by Tokyo Kasei K.K.)

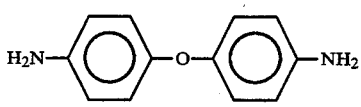

"R" denotes a compound represented by a following formula (57) (a reagent by Tokyo Kasei K.K.)

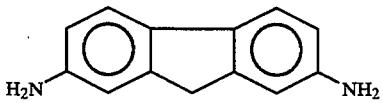

and "S" denotes 2,2-bis(p-cyanatophenyl)propane of (poly)cyanate-ester (by Tokyo Kasei K.K. )

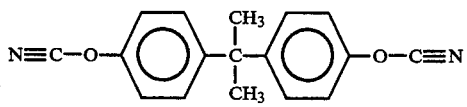

Further in the foregoing TABLE I, the column of thermoplastic resin, "PEI" denotes polyetherimide available in a trademark "ULTEM" 1000 produced by GE plastics having a glass transition temperature Tg of 217° C., number-average molecular weight of 12,000 and weight-average molecular weight of 30,000; "PAR" denotes polyarylate available in a trademark "U-Polymer U100" by UNITICA, having a glass transition temperature Tg of 190° C. and a number-average molucular weight of more than 10,000, and "PAI" denotes polyamideimide available in a trademark "TORLON 4000T" by Amoco Japan having a glass transition temperature Tg of 289° C. and number-average molecular weight more than 10,000.

The curing of the thin films was carried out for 3 hours in Examples 1–22 and Comparative Examples 1–3 respectively at such a temperature as shown in TABLE I, and the post curing was executed for 6 hours respectively at such a temperature as also shown in TABLE I. After this post curing, there was no substantial change in the phase-separated structure, i.e., in the periodic distance. The miscibilization was determined by light microscopically observing the cast film of the solution at a raised temperature, and detecting the lowest temperature at which the film turned transparent. Further, the molecular weight was measured by means of a gel permeation chromatography.

With respect to part of Examples 1–22 and Comparative Examples 1–3, a flexing resistance test was carried out in accordance with Japanese Industrial Standard, JIS-K5400, with a folding radius of 10. As a result thereof, it was found that the folding angles upon occurrence of crazing in the films of Examples 2, 10 and 13 were 45°, 20° and 45° whereas those in the films of Comparative Examples 2 and 3 were commonly 25°, and that the films obtained in Examples 2 and 13 or in similar manner thereto could be improved remarkably in respect of the crazing.

EXAMPLE 23

10 weight % solution of methylene chlorode was obtained by blending 100 parts by weight of N,N'-methylene-bis(N-phenyl maleimide) represented by the foregoing formula (2), 30 parts by weight if polyetherimide (available in a trademark ULTEM 1000 by GE plastics, glass transition temperature Tg of 217° C., number-average molecular weight 12,000 and weight-average molecular weight 30,000), 39 parts by weight of allyl-etherified o-cresol novolak (by Sumitomo Kagaku K.K., A-4L (Part A), m/n=5/5, allyl equivalent amount of 270–280 g/eq. and OH equivalent amount of 270–280 g/eq.) and 2.78 parts by weight of 2-ethyl-4-methyl imidazole (by Tokyo Kasei K.K.). This solution was cast on the cover glass and kept as cast for 24 hours at room temperatures and under a reduced pressure so as to remove the solvent, and a thin film was thereby obtained. This thin film was cured at 150° C. to be employed as a sample for the light scattering measurement, in the profile of which the scattering maximum was appearing (commonly in following Examples).

EXAMPLE 24

Another sample for the light scattering measurement was obtained in the same manner as in Example 23 only except for a change in the curing temperature to 170° C.

EXAMPLE 25

Further sample for the light scattering measurement was obtained in the same manner as in Example 23 only except for a change in the curing temperature to 200° C.

Figure 7:
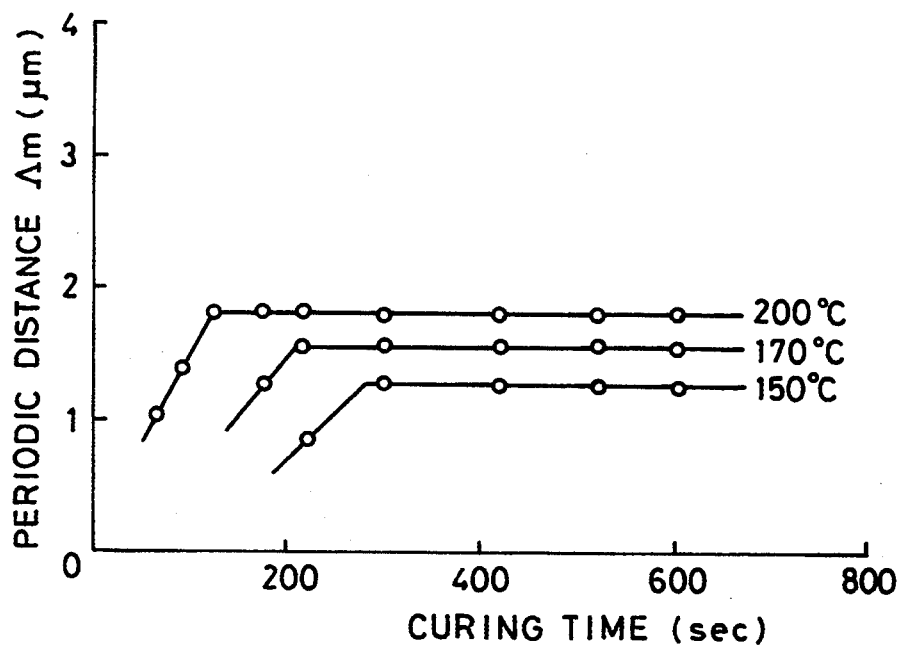
FIG. 7 is a graphical showing of variation with time in the periodic distance $\Lambda m$ when samples of Examples 23 to 25 are cured respectively at 150° C., 170° C. and 200° C.

In FIG. 7, there are shown results of the same observation as in Example 1 in respect of the variation with time in the periodic distance Λm upon curing of the samples of the above Examples 23–25. As will be clear from this drawing, it has been confirmed that the phase-separated structure was made larger as the time passes in all samples but, after a passage of certain time, the phase-separated structure was fixed.

Figure 8:
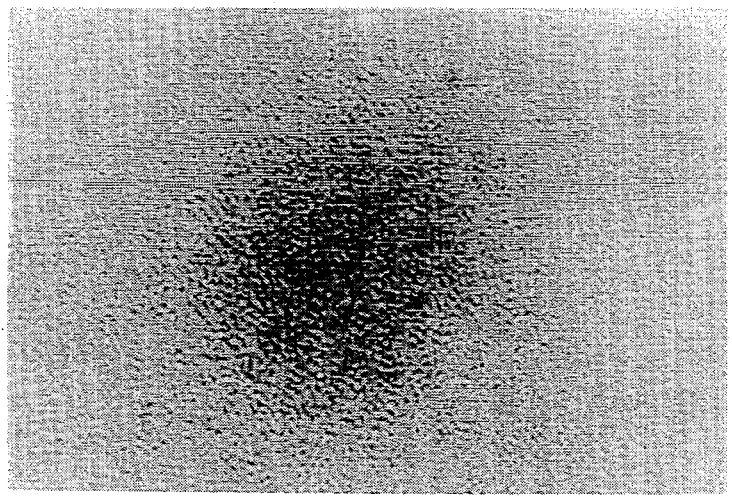
FIG. 8 is a light micrograph showing a phase-separated structure in a finally cured sample cured at 150° C. in Example 23.
Figure 9:
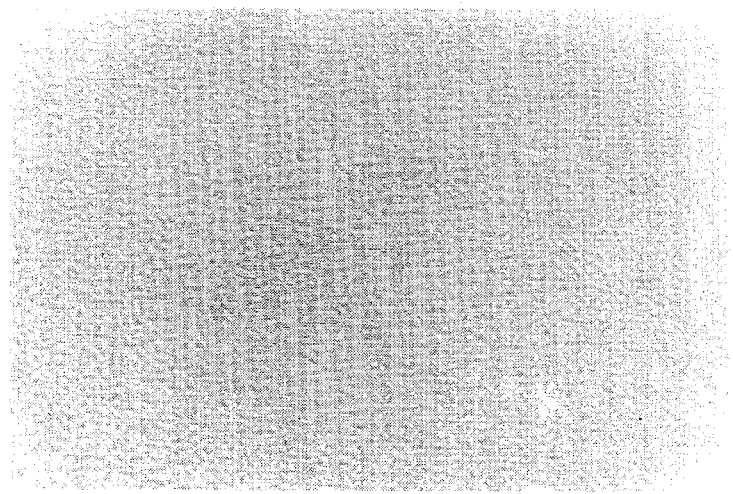
FIG. 9 is a light micrograph showing a phase-separated structure in a finally cured sample cured at 170° C. in Example 24.
Figure 10:
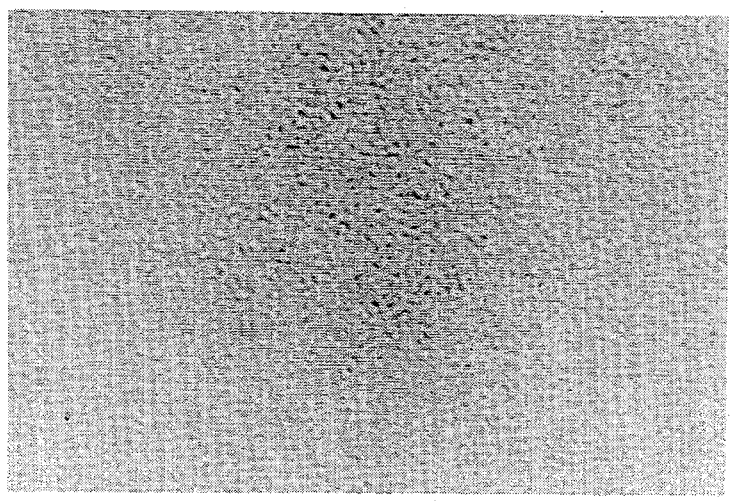
FIG. 10 is a light micrograph showing a phase-separated structure in a finally cured sample cured at 200° C. in Example 25.

In FIGS. 8 to 10, there are shown results of light microscopic observation of the phase-separated structure in the samples of the above Examples 23–25. In these drawings, a length 12 mm corresponds to a practical length of 20 μm (magnifying power of 600). As will be clear from these drawings, it has been confirmed that the periodic distance suitable for the phase-separated structure shown in FIG. 7 is present.

Figure 11:
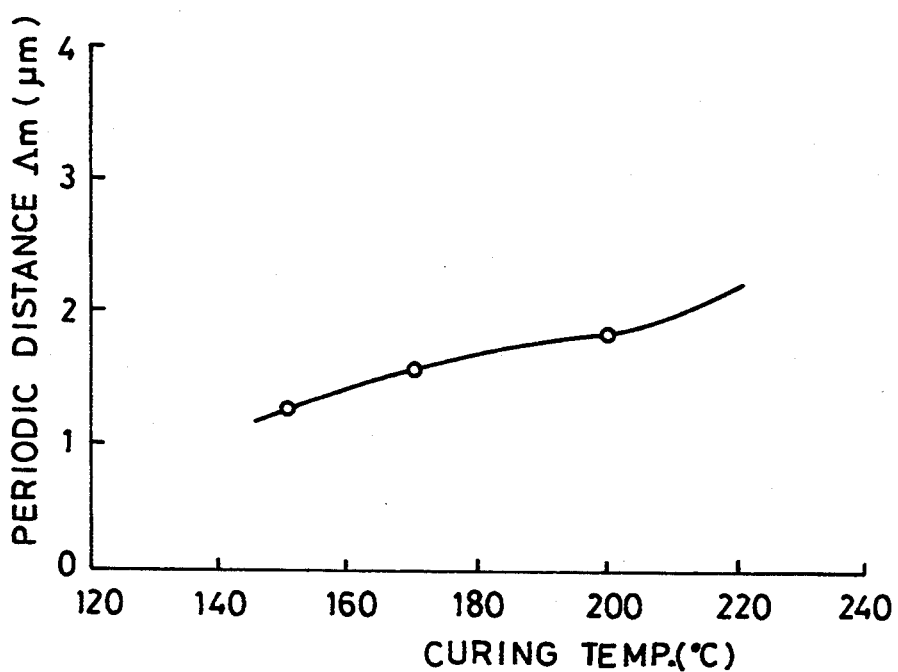
FIG. 11 shows graphically the relationship between the periodic distance $\Lambda m$ and the curing temperature in the finally cured samples in Examples 23 to 25.

In FIG. 11, further, there is shown the relationship between the periodic distance Λm and the curing temperature in the finally cured products of the respective samples in Examples 23–25. As will be clear from this drawing, it has been found that the periodic distance Λm is enlarged as the curing temperature rises.

Figure 12:
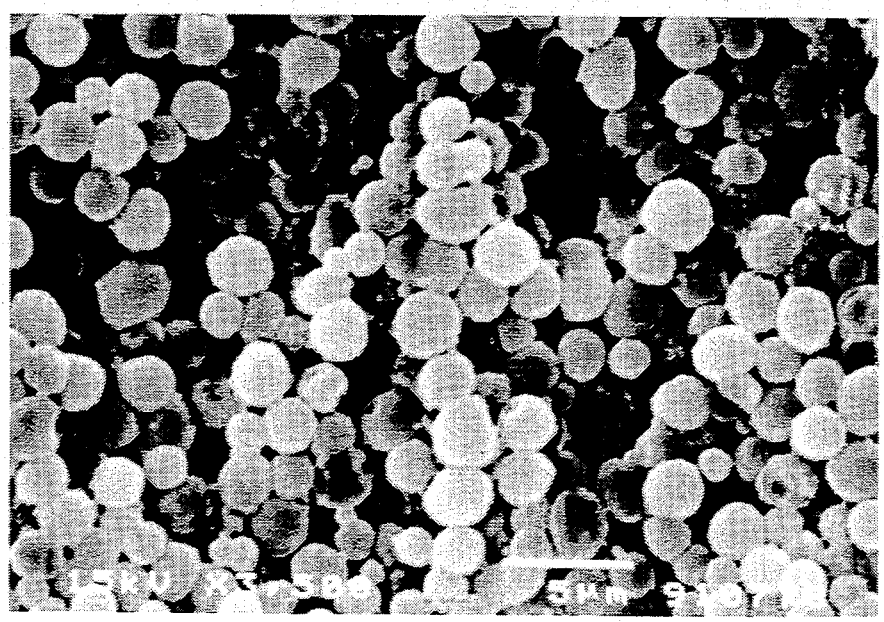
FIG. 12 is a scanning type electron micrograph showing the particle structure at the rupture cross-section etched with the solvent of the finally cured sample in Example 24.

Further, the finally cured product of the sample in Example 24 was ruptured after the complete cooling by means of the liquid nitrogen, the rupture cross-section of this product was subjected to the etching for 24 hours at room temperatures with the methylene chloride which being the solvent for completely dissolving the polyetherimide, and the polyetherimide phase was thereby removed from the rupture cross-section. The scanning type electron microscopic observation of this etched sample surface was as shown in FIG. 12, as would be clear from which an excellent connecting particle structure (interconnected-globule structure) was confirmed.

EXAMPLES 26 TO 28

Further thin films were obtained in the same manner as in Example 23 except that the 10 weight % solution of methylene chloride was prepared with such a variety of components blended as shown in a following TABLE II, and thus obtained thin films were cured at 170° C. to be further samples for the light scattering measurement. The light microscopic observation of the finally cured products of these samples has allowed an excellent periodic distance to be confirmed in the respective products, the periodic distances were also as shown in the following TABLE II.

EXAMPLE 29

10 weight % solution of methylene chloride was prepared with a blending of 100 parts by weight of N,N'-methylene-bis(N-phenyl maleimide) represented by the foregoing formula (2), 30 parts by weight of polyetherimide employed in Example 23, and 64 parts by weight of polyfunctional allylified phenol represented by the foregoing formula (40) (by Mitsubishi Yuka K.K., SH150AR, allyl equivalent amount of 110–120 g/eq., OH equivalent amount of 135–145 g/eq. and softening point of 45°–55° C.), and a further thin film was obtained in the same manner as in Example 23. This thin film was then cured at 150° C. to be a sample for the light scattering measurement.

EXAMPLE 30

A thin film was obtained in the same manner as in Example 29 but was cured with the curing temperature changed to 170° C. to be a sample for the light scattering measurement.

EXAMPLE 31

A thin film was obtained in the same manner as in Example 29 but was cured with the curing temperature changed to 200° C. to be a sample for the light scattering measurement.

Figure 13:
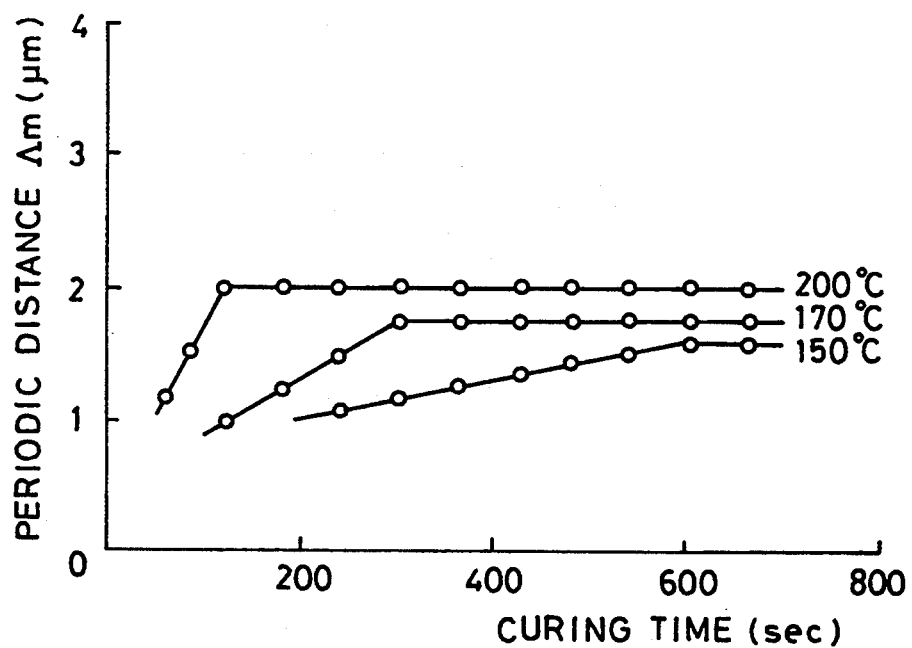
FIG. 13 shows graphically the variation with time in the periodic distance when samples of Examples 29 to 31 are cured respectively at 150° C., 170° C. and 200° C.

In FIG. 13, there are shown results of the same observation as in Example 1 of the variation with time in the periodic distance $\Lambda m$ upon curing of the samples of these Examples 29 to 31. As would be clear from this drawing, it has been confirmed that in all of the samples of these Examples the phase-separated structure was enlarged with passage of time but was fixed after a passage of certain time.

Figure 14:
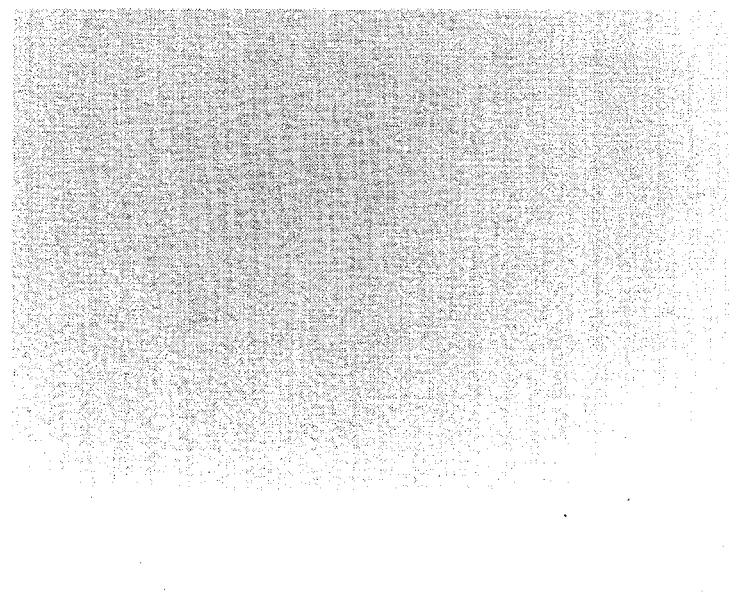
FIG. 14 is a light micrograph showing the phase-separated structure in a finally cured sample cured at 150° C. in Example 29.
Figure 15:
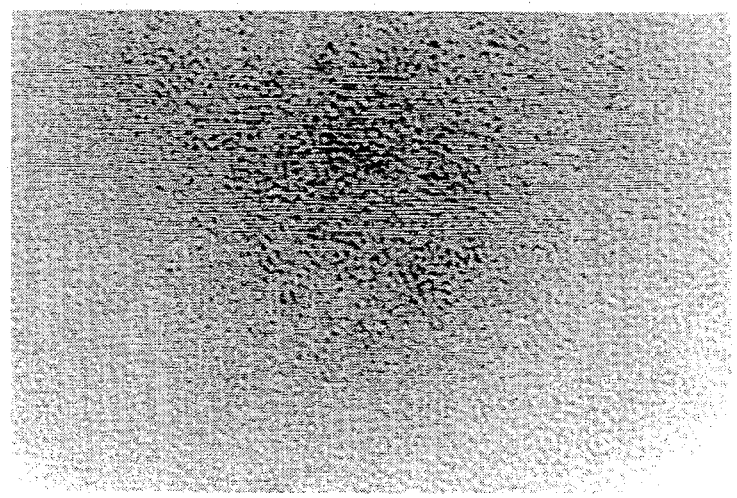
FIG. 15 is a light micrograph showing the phase-separated structure in a finally cured sample cured at 170° C. in Example 30.
Figure 16:
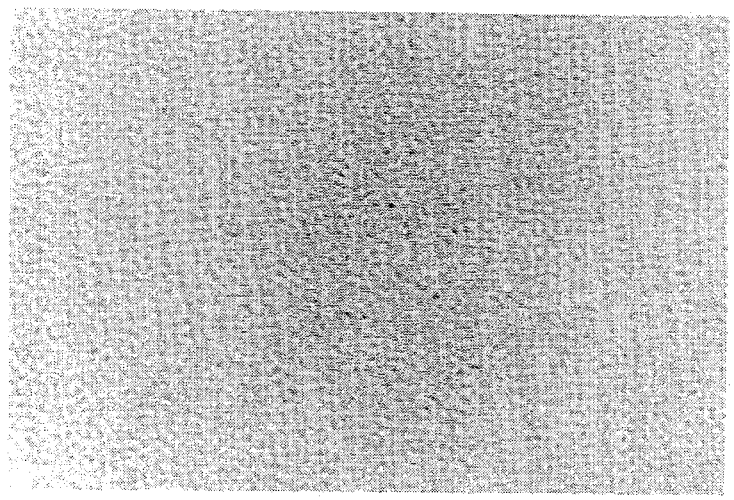
FIG. 16 is a light micrograph showing the phase-separated structure in a finally cured sample cured at 200° C. in Example 31.

In FIGS. 14 to 16, there are shown results of light microscopic observation of the phase-separated structure in the finally cured products of the samples in the above Examples 29 to 31. In these drawings, a length 12 mm corresponds to a practical length of 20 $\mu$m (magnifying power 600). As would be clear from these drawings, the presence of periodic distance suitable for the phase-separated structure shown in FIG. 13 has been confirmed.

Figure 17:
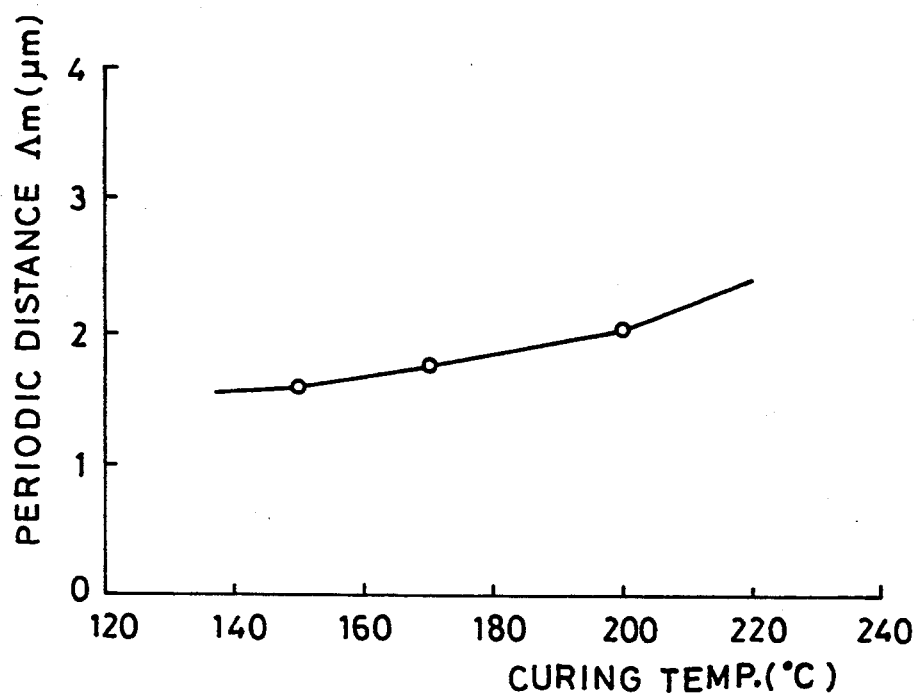
FIG. 17 is a graph showing the relationship between the periodic distance $\Lambda m$ and the curing temperature in the finally cured samples in Examples 29 to 31.

In FIG. 17, further, there is shown a relationship between the periodic distance $\Lambda m$ and the curing temperature of the finally cured product of the samples in the respective Examples 29 to 31. As will be clear from this drawing, it has been found that the periodic distance $\Lambda m$ is enlarged as the curing temperature rises.

Figure 18:
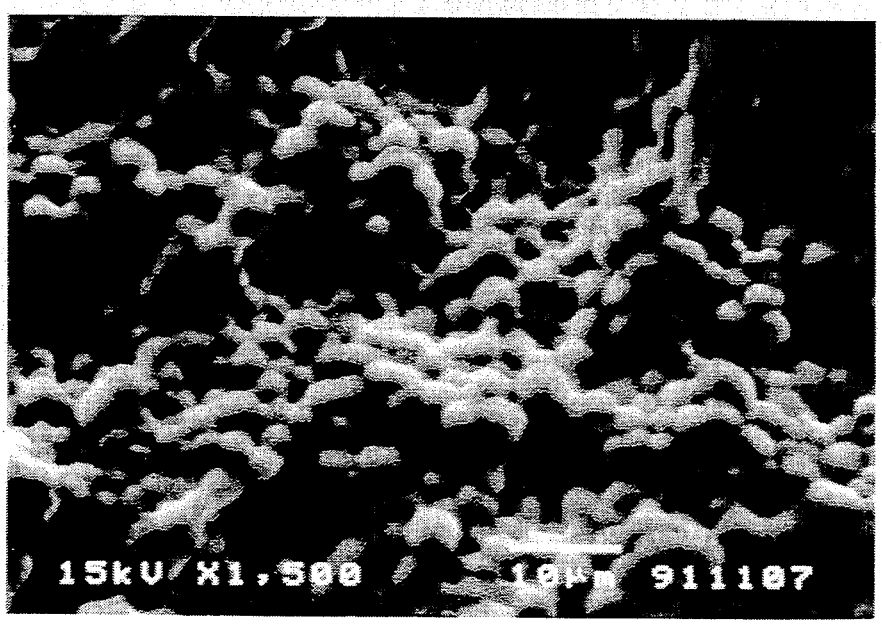
FIG. 18 is a scanning type electron micrograph showing the particle structure at the rupture cross-section etched with the solvent of the finally cured sample in Example 30.

The finally cured product of the sample in Example 30 was ruptured after the complete cooling by means of the liquid nitrogen, and its rupture cross-section was subjected to the etching for 24 hours at room temperatures with methylene chloride as the solvent readily dissolving the polyetherimide phase. The thus etched rupture cross-section was observed with the scanning type electron microscope, results of which were as shown in FIG. 18. As would be clear from this drawing, there could be confirmed an excellent connecting particle structure (interconeccted-globule structure).

EXAMPLE 32

A thin film was obtained in the same manner as in Example 23, except that the 10 weight % solution of methylene chloride was prepared with such modified components as shown in the following TABLE II. The thin film thus obtained was cured at 170° C. to be a sample for the light scattering measurement. Results of light microscopic observation of the finally cured product of this sample have shown an excellent periodic distance, as also shown in the following TABLE II.

EXAMPLE 33

A thin film was obtained in the same manner as in Example 23, except that the 10 weight % solution of methylene chloride was prepared with such modified components as shown in the following TABLE II. The thin film thus obtained was cured at 200° C. to be a sample for the light scattering measurement. Results of light microscopic observation of the finally cured product of this sample have shown an excellent periodic distance, as also shown in the following TABLE II.

EXAMPLE 34

A thin film was obtained in the same manner as in Example 23 with a 10 weight % solution of methylene chloride prepared with a blending of 100 parts by weight of N,N'-methylene-bis(N-phenyl maleimide) represented by the foregoing formula (2), 30 parts by weight of polyetherimide employed in Example 23, 75 parts by weight of o,o'-diallyl-bisphenol A represented by the foregoing formula (41) (by Mitsui Toatsu Kagaku K.K., BPA-CA) and 1.75 parts by weight of 2-phenylimidazole (a reagent by Tokyo Kasei K.K.), and thus obtained thin film was cured at 150° C. to be a sample for the light scattering measurement.

EXAMPLE 35

The thin film obtained in Example 34 was cured at 170° C. to be a sample for the light scattering measurement.

EXAMPLE 36

The thin film obtained in Example 34 was cured at 200° C. to be a sample for the light scattering measurement.

Figure 19:
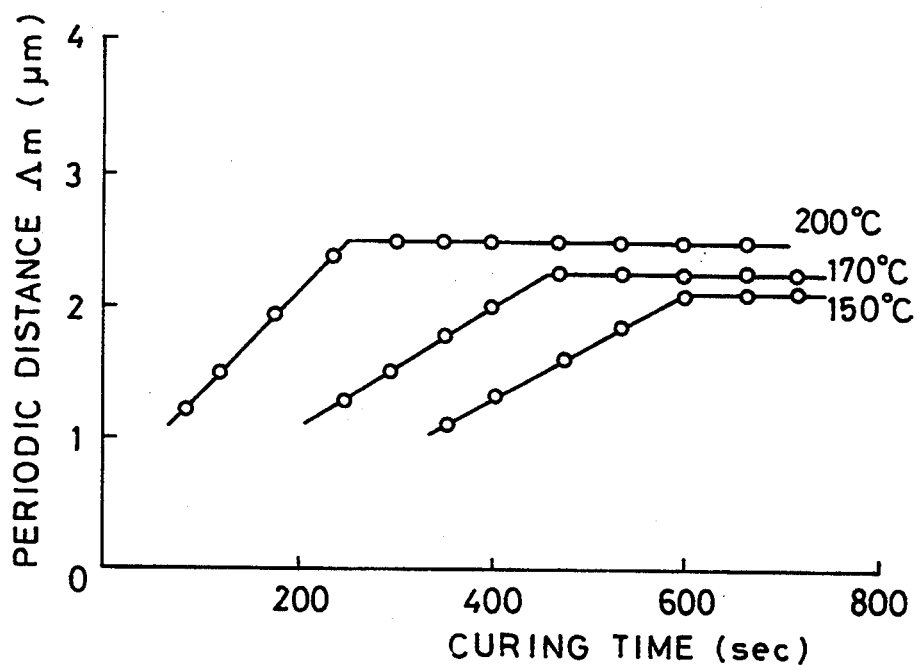
FIG. 19 shows graphically the variation with time in the structural cycle when samples of Examples 34 to 36 are cured respectively at 150° C., 170° C. and 200° C.

In FIG. 19, there are shown results of the same observation as in Example 1 of the variation with time in the periodic distance $\Lambda m$ upon curing of the samples in Examples 34 to 36. As would be clear from this drawing, it has been confirmed that the phase-separated structure was enlarged with passage of time in all of these samples but was fixed upon passage of a certain time.

Figure 20:
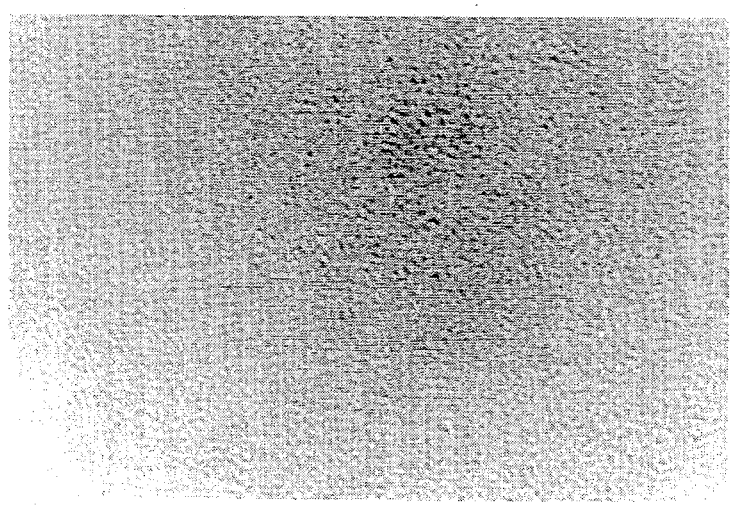
FIG. 20 is a light micrograph showing a phase-separated structure in a finally cured sample cured at 150° C. in Example 34.
Figure 21:
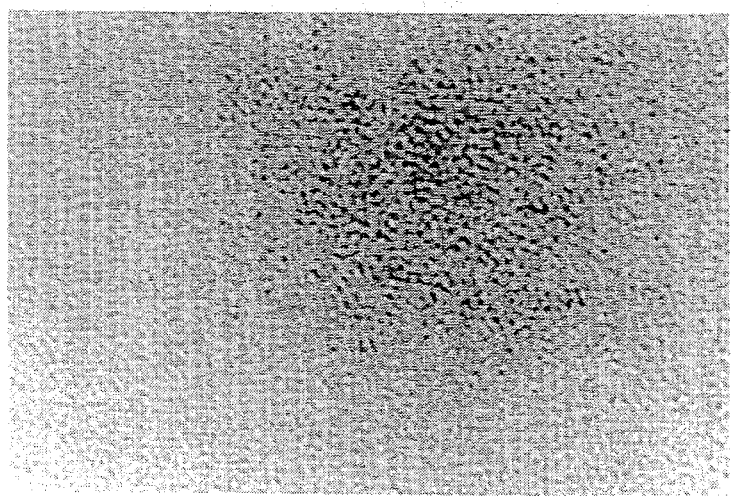
FIG. 21 is a light micrograph showing a phase-separated structure in a finally cured sample cured at 170° C. in Example 35.
Figure 22:
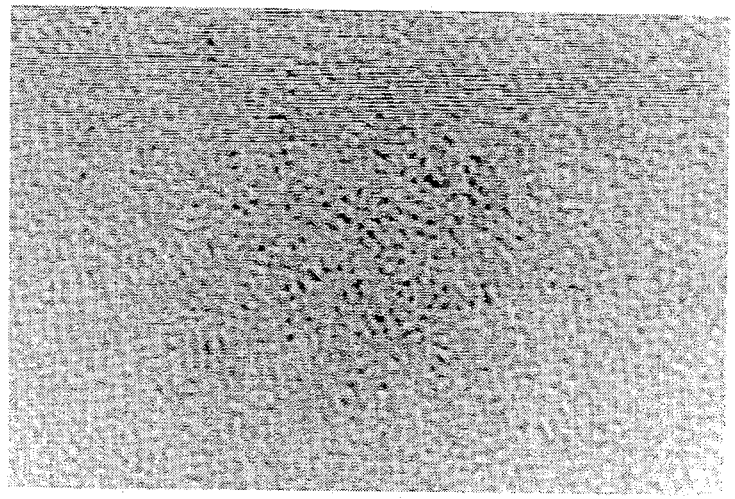
FIG. 22 is a light micrograph showing a phase-separated structure in a finally cured sample cured at 200° C. in Example 36.

Further in FIGS. 20 to 22, there are shown results of the light microscopic observation of the phase-separated structure in the finally cured products of the samples in the above Examples 34 to 36. In these drawings, a length of 12 mm corresponds to the practical length 20 μm (magnifying power of 600). As would be clear from these drawings, there has been confirmed the presence of the periodic distance suitable for the phase-separated structure shown in FIG. 19.

Figure 23:
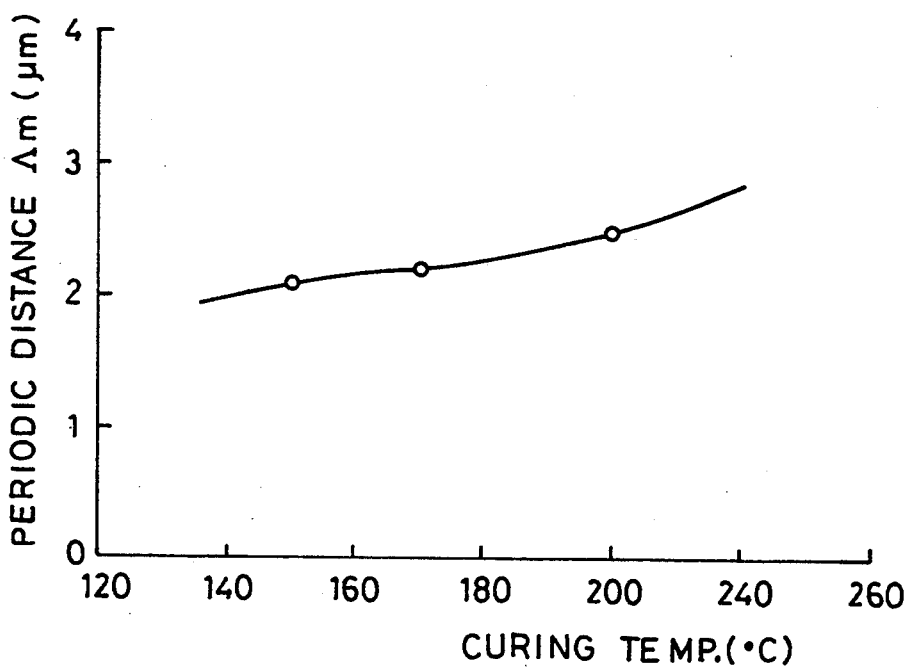
FIG. 23 is a graph showing the relationship between the periodic distance $\Lambda m$ and the curing temperature in the finally cured samples in Examples 34 to 36.

In FIG. 23, further, there is shown the relationship between the periodic distance Λm and the curing temperature of the finally cured products of the samples in Examples 34 to 36. As will be clear from this drawing, it has been found that the periodic distance Λm is enlarged as the curing temperature rises.

Figure 24:
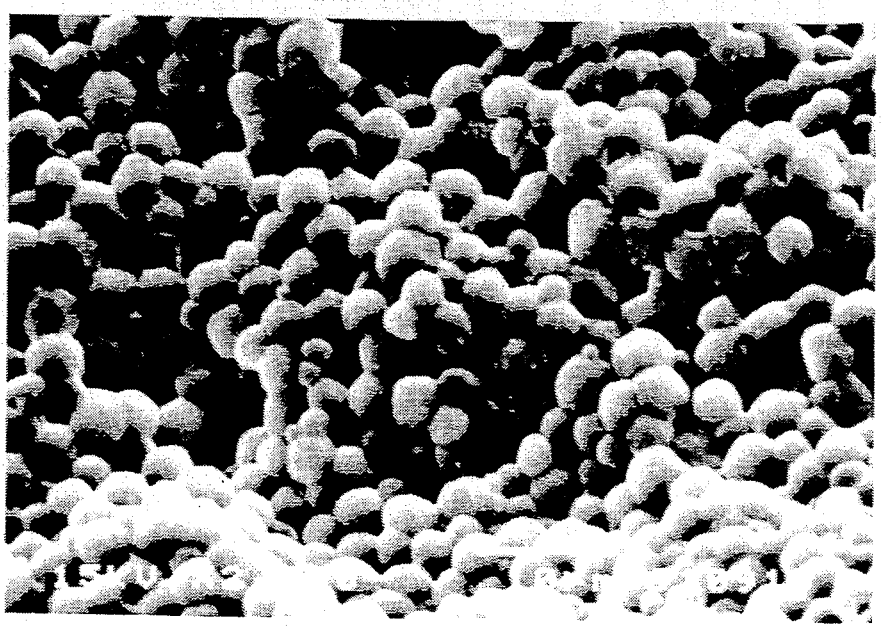
FIG. 24 is a scanning type electron micrograph showing the particle structure at the rupture cross-section etched with the solvent of the finally cured sample in Example 35.

The finally cured product of the sample in Example 35 was ruptured after the complete cooling by means of liquid nitrogen, the rupture cross-section of this product was subjected to the etching for 24 hours at room temperatures with methylene chloride employed as the solvent easily dissolving polyetherimide, and the polyetherimide phase was removed from the rupture cross-section. A scanning type electron microscopic observation of the thus etched rupture cross-section was as shown in FIG. 24, as would be clear from which there could be confirmed the presence of excellent connecting particle structure (interconnected-globule structure).

EXAMPLES 37 TO 40

The thin films were obtained in the same manner as in Example 23 except that the 10 weight % solution of methylene chloride was prepared with such variety of components blended as shown in the following TABLE II. Thereby obtained thin films were cured respectively at such temperature as shown also in TABLE II, so as to be the samples for the light scattering measurement. Results of light microscopic observation of the finally cured products of these samples have shown the presence of excellent periodic distance in these samples, as also shown in TABLE II.

EXAMPLES 41 TO 45

The thin films were obtained in the same manner as in Example 23 except that the 10 weight % solution of methylene chloride was prepared with such changes in the components blended as shown in the following TABLE II. Thus obtained thin films were cured respectively at such temperature as shown also in TABLE II, so as to be the samples for the light scattering measurement. Results of light microscopic observation of the finally cured products of these samples have shown the presence of excellent periodic distance in these samples, as also shown in TABLE II.

EXAMPLE 46

The 10 weight % solution of methylene chloride was obtained with a blend of 100 parts by weight of polyfunctional unsaturated imide represented by the foregoing formula (3) (by Mitsui Toatsu K.K., BMI-M20) and 30 parts by weight of polyetherimide employed in Example 23. The thin film obtained 5n the same manner as in Example 23 with the thus obtained solution was cured at 150° C. to be the sample for the light scattering measurement. Results of the light microscopic observation of the finally cured product have proved the presence of excellent periodic distance, as also shown in TABLE II.

EXAMPLES 47 TO 49

The thin films were obtained in the same manner as in Example 23 except that the 10 weight % solution of methylene chloride was prepared with such variety of blends of the components as shown in the following TABLE II, the thus obtained thin films were cured at such temperatures as also shown in TABLE II, and they were made to be the samples for the light scattering measurement. Results of the light microscopic observation of the finally cured products of these samples have proved the presence of excellent periodic distance, as also shown in TABLE II.

EXAMPLE 50

The thin film was obtained in the same manner as in Example 23 except that a 10 weight % solution of N,N'-dimethylformamide with such blend of components as shown in the following TABLE II and the drying time for this solution as cast was modified to 72 hours, and thus obtained thin film was cured at 200° C. to be the sample for the light scattering measurement. Their finally cured products were observed by the light microscope, the result of which has confirmed the presence of excellent periodic distance of 2.7 μm.

COMPARATIVE EXAMPLES 4 TO 10

10 weight % solutions of methylene chloride were prepared with such a variety of components blended as shown in the following TABLE II, which solutions were cast on tinplates, then the thin films were obtained from the cast solutions in the same manner as in Example 23, and these thin films were cured at such temperatures as shown in TABLE II to form further samples. Among these samples, however, the one of Comparative Example 7 was caused to craze and was unable to be subjected to any measurement.

The samples of some of the above Examples and Comparative Examples were subjected to the flexing resistance test according to JIS-K5400 with the folding radius of 10. As a result of the test, it has been found that the samples of Examples 24, 30 and 35 show commonly a folding angle of 45° upon occurrence of the crazing whereas the samples of Comparative Examples 4 to 6 are of 25° commonly, and thus that the samples of the respective Examples according to the present invention or those prepared in similar manner thereto have been remarkably improved in respect of the crazing.

TABLE II

| | Composition Ratio (Parts by weight) | | | | | | | | | | | | Thermoplastic Resin | | | Solvent (wt. %) | Cur. temp. (°C.) | Post Cur. temp. (°C.) | Perd. Dist. (μm) | Miscibd. (Homogeneous) (°C.) |
|---|---|---|---|---|---|---|---|---|---|---|---|---|---|---|---|---|---|---|---|---|
| | Polyfunctional Unsat. Imide | | | | Crosslinking Agent | | | | | | | | | | | | | | | |
| | J | K | M | N | T | U | V | W | X | Y | Z | Catalyst | PEI | PAR | PAI | | | | | |
| EX. No. | | | | | | | | | | | | | | | | | | | | |
| 23 | 100 | — | — | — | 39 | — | — | — | — | — | — | 2E4MZ 2.78 | 30 | — | — | CH$_2$Cl$_2$ 10 | 150 | 250 | — | 135 |
| 24 | 100 | — | — | — | 39 | — | — | — | — | — | — | 2E4MZ 2.78 | 30 | — | — | CH$_2$Cl$_2$ 10 | 170 | 250 | — | 135 |
| 25 | 100 | — | — | — | 39 | — | — | — | — | — | — | 2E4MZ 2.78 | 30 | — | — | CH$_2$Cl$_2$ 10 | 200 | 250 | — | 135 |
| 26 | 100 | — | — | — | 39 | — | — | — | — | — | — | 2UZ 1.39 | — | 30 | — | CH$_2$Cl$_2$ 10 | 170 | 250 | 4.1 | 135 |
| 27 | 100 | — | — | — | — | 39 | — | — | — | — | — | 2UZ 1.39 | 30 | — | — | CH$_2$Cl$_2$ 10 | 170 | 250 | 2.1 | 135 |
| 28 | 100 | — | — | — | — | — | 39 | — | — | — | — | — | 30 | — | — | CH$_2$Cl$_2$ 10 | 170 | 250 | 2.0 | 135 |
| 29 | 100 | — | — | — | — | — | — | 64 | — | — | — | — | 30 | — | — | CH$_2$Cl$_2$ 10 | 150 | 250 | 2.0 | 140 |
| 30 | 100 | — | — | — | — | — | — | 64 | — | — | — | — | 30 | — | — | CH$_2$Cl$_2$ 10 | 170 | 250 | — | 140 |
| 31 | 100 | — | — | — | — | — | — | 64 | — | — | — | — | 30 | — | — | CH$_2$Cl$_2$ 10 | 200 | 250 | — | 140 |
| 32 | 100 | — | — | — | — | 16 | — | — | — | — | — | — | 30 | — | — | CH$_2$Cl$_2$ 10 | 170 | 250 | 1.9 | 155 |
| 33 | 100 | — | — | — | — | — | — | 16 | — | — | — | — | 30 | — | — | CH$_2$Cl$_2$ 10 | 200 | 250 | 2.1 | 155 |
| 34 | 100 | — | — | — | — | — | — | — | 75 | — | — | 2PZ 1.75 | 30 | — | — | CH$_2$Cl$_2$ 10 | 150 | 250 | — | 135 |
| 35 | 100 | — | — | — | — | — | — | — | 75 | — | — | 2PZ 1.75 | 30 | — | — | CH$_2$Cl$_2$ 10 | 170 | 250 | — | 135 |
| 36 | 100 | — | — | — | — | — | — | — | 75 | — | — | 2PZ 1.75 | 30 | — | — | CH$_2$Cl$_2$ 10 | 200 | 250 | — | 135 |
| 37 | 100 | — | — | — | — | — | — | — | — | 75 | — | DCP 1.75 | 30 | — | — | CH$_2$Cl$_2$ 10 | 150 | 250 | 1.9 | 135 |
| 38 | 100 | — | — | — | — | — | — | — | — | 75 | — | DCP 1.75 | — | 30 | — | CH$_2$Cl$_2$ 10 | 150 | 250 | 1.9 | 135 |
| 39 | 100 | — | — | — | — | — | — | — | — | — | 46 | DCP 0.73 | 30 | — | — | CH$_2$Cl$_2$ 10 | 150 | 230 | 1.9 | 140 |
| 40 | 100 | — | — | — | — | — | — | — | — | — | 46 | DCP 0.73 | — | 30 | — | CH$_2$Cl$_2$ 10 | 150 | 230 | 2.2 | 140 |
| 41 | — | 100 | — | — | 39 | — | — | — | — | — | — | — | 30 | — | — | CH$_2$Cl$_2$ 10 | 170 | 250 | 2.4 | 155 |
| 42 | — | — | 100 | — | 39 | — | — | — | — | — | — | — | 30 | — | — | CH$_2$Cl$_2$ 10 | 170 | 250 | 3.2 | 125 |
| 43 | — | — | — | 100 | 39 | — | — | — | — | — | — | — | 30 | — | — | CH$_2$Cl$_2$ 10 | 170 | 250 | 2.3 | 135 |
| 44 | 50 | — | 50 | — | 39 | — | — | — | — | — | — | — | 30 | — | — | CH$_2$Cl$_2$ 10 | 170 | 250 | 2.7 | 130 |
| 45 | 50 | — | — | 50 | 39 | — | — | — | — | — | — | — | 30 | — | — | CH$_2$Cl$_2$ 10 | 170 | 250 | 2.2 | 135 |
| 46 | — | — | — | 100 | — | — | — | — | — | — | — | — | 30 | — | — | CH$_2$Cl$_2$ 10 | 150 | 250 | 1.7 | 145 |
| 47 | — | — | — | 100 | — | — | — | — | — | — | — | — | 30 | — | — | CH$_2$Cl$_2$ 10 | 170 | 250 | 1.9 | 145 |
| 48 | — | — | — | 100 | — | — | — | — | — | — | — | — | 30 | — | — | CH$_2$Cl$_2$ 10 | 200 | 250 | 2.5 | 145 |
| 49 | — | — | — | 100 | — | — | — | — | — | — | — | — | — | 30 | — | CH$_2$Cl$_2$ 10 | 170 | 250 | 2.1 | 145 |
| 50 | — | — | — | 100 | — | — | — | — | — | — | — | — | — | — | 30 | DMF 10 | 200 | 250 | 2.7 | 145 |
| Comp. Ex. No. | | | | | | | | | | | | | | | | | | | | |
| 4 | 100 | — | — | — | 39 | — | — | — | — | — | — | — | — | — | — | CH$_2$Cl$_2$ 10 | 170 | 250 | — | — |
| 5 | 100 | — | — | — | — | — | — | 64 | — | — | — | — | — | — | — | CH$_2$Cl$_2$ 10 | 170 | 250 | — | — |
| 6 | 100 | — | — | — | — | — | — | — | — | — | — | — | — | — | — | CH$_2$Cl$_2$ 10 | 170 | 250 | — | — |
| 7 | — | — | — | 100 | — | — | — | — | 75 | — | — | — | — | — | — | CH$_2$Cl$_2$ 10 | 170 | 250 | — | — |
| 8 | 100 | — | — | — | 27.7 | — | — | — | — | — | — | — | — | — | — | CH$_2$Cl$_2$ 10 | 150 | 230 | 1.0 | 135 |
| 9 | 100 | — | — | — | — | — | — | — | — | 52 | — | — | — | — | — | DMF 10 | 200 | 250 | 1.4 | 130 |
| 10 | 100 | — | — | — | 34.6 | — | — | — | — | — | — | — | — | — | — | " | 200 | 250 | 2.0 | 160 |

In the above TABLE II, "J", "K" and "M" for polyfunctional unsaturated imide as well as "PEI", "PAR"

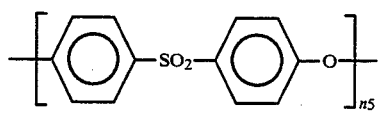

(59)

in which "$n_5$" denotes a positive integer.

Further, in the above TABLE II, "2UZ" denotes 2-undecyl imidazole (a reagent by Tokyo Kasei K.K.), "2E4MZ" denotes 2-ethyl-4-methylimidazole (a reagent by Tokyo Kasei K.K.), "2PZ" denotes 2-phenylimidazole (a reagent by Tokyo Kasei K.K.) and "DCP" denotes dicumyl peroxide (by Nihon Yushi K.K.). For the crosslinking agent in Comparativea Example 9, (poly)cyanate-ester was employed similarly to Example 17. Further, while the curing time of the thin film was 3 hours and the post curing time was 2 to 6 hours, there was no change in the dimensions of the phase-separated structure. The miscibilization was observed in the same manner as has been described with reference to TABLE I.

EXAMPLE 51

10 weight % solution of methylene chloride was prepared by blending 52 parts by weight of N,N'-methylene-bis(N-phenyl maleimide) represented by the foregoing formula (2), 48 parts by weight of epoxy resin (EP-828 by Yuka Shell K.K., 2-functional epoxy resin of epoxy equivalent amount 190 g/eq.), 26.9 parts by weight of 4,4'-diaminodiphenylmethane represented by the foregoing formula (54) (a reagent by Tokyo Kasei K.K.) and 30 parts by weight of polyetherimide represented by the foregoing formula (46). A thin film obtained in the same manner as in Example 23 with this solution was cured for 3 hours at 150° C. and was then subjected to the post curing for 3 hours at 230° C., so as to be a sample for the light scattering measurement. This sample has also shown the phase-separated structure having an optimum periodic distance, similarly to the foregoing Examples.

COMPARATIVE EXAMPLE 11

A thin film was obtained in the same manner as in Example 51 except that N,N'-methylene-bis(N-phenyl maleimide) was not employed and the loadings of epoxy resin and 4,4'-diaminodiphenylmethane were modified respectively to 100 parts by weight and 26 parts by weight. The obtained thin film was cured for 3 hours at 150° C. and was then subjected to the post curing for 3 hours at 230° C., and a sample was thereby obtained.

COMPARATIVE EXAMPLE 12

10 weight % solution of methylene chloride was obtained by blending 100 parts by weight of N,N'-methylene-bis(N-phenyl maleimide) represented by the foregoing formula (2) and 30 parts by weight of polycarbonate (H4000 by Mitsubishi Gas Kagaku K.K., glass transition temperature Tg of 150° C., number-average molecular weight of more than .10,000, viscosity-average molecular weight of 15,000 and weight-average molecular weight of 18,000). With this solution, a thin film was obtained in the same manner as in Example 51, and this thin film was made to be a sample by subjecting it to the curing for 3 hours at 160° C. and then to the post curing for 3 hours at 230° C.

The respective samples obtained in the foregoing Examples 1, 10, 12, 15, 16, 23 and 51 and Comparative Examples 11 and 12 were tested in respect of the heat resistance, with an evaluation of a ratio ($E_3 = E_2/E_1$) by measuring the modulus of elasticity $E_1$ at room temperatures and that $E_2$ at 180° C. While higher values of this ratio $E_3$ are to be evaluated to be excellent heat resistance, the samples of Examples 1, 10, 12, 15, 16 and 23 have shown $E_3$ of 1.0 and the sample of Example 51 was of 0.2, so as to be high, whereas the samples of Comparative Examples 11 and 12 have shown both to be 0.01. That is, it has been found that the products according to the present invention are remarkably excellent in the heat resistance.

Further, the samples of Example 1 and Comparative Example 8 were subjected to a test of dielectric loss tangent according to JIS-K5400, a result of which was 0.0046 for the former but 0.0122 for the latter, and it has been found that the product according to the present invention is excellent in this respect, too. Further, the samples of Example 17 and Comparative Example 9 were subjected to a test of fracture toughness $K_{IC}$ according to ASTM E399-72, with Instron-type tensile tester at an atmospheric temperature of 23°±2° C. and a crosshead speed of 0.5 (mm/min.), the result of which test was 1.8 ($MNm^{-3/2}$) for the former and 1.2 ($MNm^{-3/2}$) for the latter, and it could be observed that the present invention was excellent in this connection, too. Moreover, the samples of Example 4 and Comparative Example 10 were tested in respect of the heat resistance from another view point by obtaining a ratio $E_5 = E_4/E_1$ of the modulus of elasticity $E_4$ after the post curing at 250° C. and that $E_1$ at the room temperatures, the result of which was 1.0 for the former but 0.01 for the latter, and it could be appreciated that the present invention was remarkably excellent also in this respect.

What is claimed is:

1. An uncured thermosetting polyimide composition containing as essential components a poly-unsaturated imide represented by the following formula and a thermoplastic resin, wherein said thermoplastic resin is at least one selected from the group consisting of polyetherimide, polyarylate and polyamideimide having a number-average molecular weight of more than 10,000,

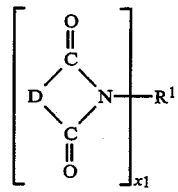

in which "D" denotes a bivalent group having at least one carbon-carbon double bond, "$R^1$" denotes an $x_1$-valent organic group and "$x_1$" denotes an integer more than 1, said thermoplastic resin and said poly-unsaturated imide being present in a miscibilized region with the amount of said thermoplastic resin being 10 to 50 parts by weight with respect to 100 parts by weight of said poly-unsaturated imide and said composition is capable, after being cured, of forming a structure in which a phase mainly of a cured resin of poly-unsaturated imide and a phase mainly of thermoplastic resin are mutually separated and are regularly entangled with each other.

2. The composition according to claim 1 which further contains at least one crosslinking agent selected from the group consisting of
(a) a polyamine represented by the following first formula,

wherein $R^2$ denotes an $x_2$-valent organic group and $x_2$ denotes an integer more than 1;
(b) a (poly)cyanate-ester compound represented by the following second formula,

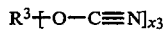

wherein $R^3$ denotes an $x_3$-valent organic group having at least one aromatic ring and $x_3$ denotes an integer more than 1;
(c) a first poly-unsaturated compound represented by the following third formula,

[$R^4$—CH=CH$\}_{x4}$—$R^5$]

wherein $R^4$ denotes an H or $CH_3$ group, $R^5$ denotes an $x_4$-valent organic group having at least one aromatic ring, and $x_4$ denotes an integer more than 1; and
(d) a second poly-unsaturated compound represented by the following fourth formula;

[$CH_2$=CH—$R^6\}_{x5}$—$R^7$]

wherein $R^6$ denotes a —$CH_2$— group or a —$CH_2$—O— group, $R^7$ denotes an $x_5$-valent organic group having at least one ring selected from the group consisting of an aromatic ring and a triazine ring and $x_5$ denotes an integer more than 1.

3. The composition according to claim 1 wherein said polyetherimide is a compound containing recurring units represented by the following formula;

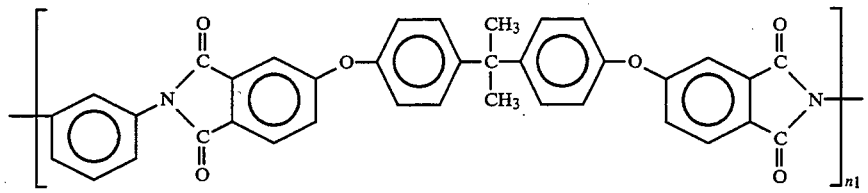

in which "$n_1$" denoting a positive integer.

4. The composition according to claim 1 wherein said polyarylate is a compound represented by a following formula;

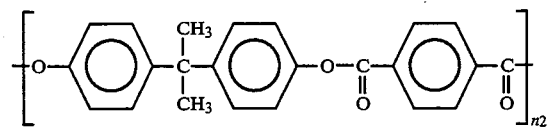

in which "$n_2$" denoting a positive integer.

5. The composition according to claim 1 wherein said polyamideimide is a compound represented by a following formula;

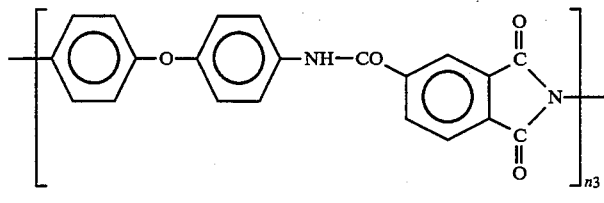

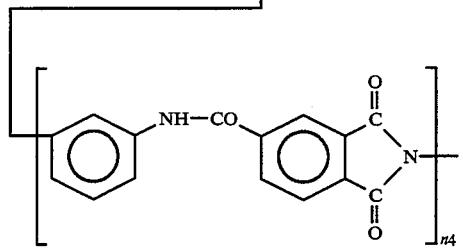

in which "$n_3$" and "$n_4$" denoting respectively a positive integer.

6. A thermoset product of a thermosetting polyimide composition containing as essential components a poly-unsaturated imide and a thermoplastic resin, wherein a phase mainly of polyimide and a phase mainly of said thermoplastic resin are mutually separated, both of said phases showing a sequential periodic distance and regularly entangling with each other.

7. The product according to claim 6 wherein said periodic distance that is calculated from the scattering maximum in a light scattering measurement is in the range from 0.1 to 10 μm.

8. A process for manufacturing a thermoset product containing a thermosetting polyimide composition comprising:

combining a poly-unsaturated imide and a thermoplastic resin to form a solution such that said poly-unsaturated imide and said thermoplastic resin are miscibilized with each other, and thermosetting said solution to cause a phase mainly of polyimide and a phase mainly of said thermoplastic resin to be mutually separated, with said phases showing a sequential periodic distance and regularly entangling with each other.

9. The process according to claim 8 wherein said solution is attained with the presence of at least one solvent selected from the group consisting of methylene chloride, N,N'-dimethylacetamide, dimethyl sulfoxide, N-methylpyrrolidone, N,N'-dimethylformamide and methyl cellosolve(2-methoxyethanol).

* * * * *

UNITED STATES PATENT AND TRADEMARK OFFICE
CERTIFICATE OF CORRECTION

PATENT NO. : 5,401,812
DATED : March 28, 1995
INVENTOR(S) : Hiroshi YAMAMOTO, et al.

It is certified that error appears in the above-indentified patent and that said Letters Patent is hereby corrected as shown below:

Column 1, line 7, delete "the".

Column 1, line 14, change "The" at end of line to --the--.

Column 1, line 19, delete "the".

Column 1, line 47, delete "the".

Column 2, line 22, change "Using" to --using--.

Column 2, line 60, delete "the".

Column 5, line 11, delete "the".

Column 5, line 20, after "that" insert --is--.

Column 5, line 33, delete "are forming" and insert --form--.

Column 6, line 11, after "..imide")," insert --the-- and change "followings" to --following--.

Column 6, line 15, change "hexamithylene" to --hexamethylene--.

Column 7, line 51, change "satisfiable" to --satisfactory--.

UNITED STATES PATENT AND TRADEMARK OFFICE
CERTIFICATE OF CORRECTION

PATENT NO. : 5,401,812
DATED : March 28, 1995
INVENTOR(S) : Hiroshi YAMAMOTO, et al.

It is certified that error appears in the above-indentified patent and that said Letters Patent is hereby corrected as shown below:

Column 7, line 52, delete "the".

Column 7, line 68, delete "of".

Column 8, line 38, delete "of".

Column 8, line 45, delete "of".

Column 8, line 55, delete "of".

Column 19, line 10, after "carrying" insert --out--.

Column 19, lines 17 and 18, delete "has to be deteriorated." and insert --deteriorates.--.

Column 19, line 20, change "exceeds" to --exceeding--.

Column 19, line 36, delete "has to be deteriorated." and insert --deteriorates.--.

Column 20, line 13, after "is" insert --generally--.

Column 20, line 14, delete "general sense" and before "less" insert --to be--.

Column 20, line 20, delete "on the other hand".

UNITED STATES PATENT AND TRADEMARK OFFICE
CERTIFICATE OF CORRECTION

PATENT NO. : 5,401,812
DATED : March 28, 1995
INVENTOR(S) : Hiroshi YAMAMOTO, et al.

It is certified that error appears in the above-indentified patent and that said Letters Patent is hereby corrected as shown below:

Column 20, line 33, change "warnish" to --varnish-- and delete "as".

Column 20, line 45, change "and" to --or--.

Column 21, line 15, change "modurated" to --modified--.

Column 21, line 22, change "moleculars" to --molecules--.

Column 21, line 26, change "modurated" to --modified--.

Column 21, line 51, change "modurated" to --modified--.

Column 21, line 58, change "modurated" to --modified--.

Column 22, lines 35 and 36, delete "in the order of molecule" and insert --at the molecular level--.

Column 22, line 38, delete "in a moment" and insert --rapidly--.

Column 23, line 2, change "grind" to --grinding by--.

Column 23, line 15, change "imde," to --imide--.

UNITED STATES PATENT AND TRADEMARK OFFICE
CERTIFICATE OF CORRECTION

PATENT NO. : 5,401,812
DATED : March 28, 1995
INVENTOR(S) : Hiroshi YAMAMOTO, et al.

It is certified that error appears in the above-indentified patent and that said Letters Patent is hereby corrected as shown below:

Column 23, line 30, change "deteriorated" to --deterioration--.

Column 23, line 35, change "deteriorated" to --deterioration--.

Column 23, line 62, change " Tokyo, Japan)" to --(Tokyo, Japan)--.

Column 24, line 29, change "Exmaples" to --Examples--.

Column 25, line 10, change "#or" to --for--.

Column 26, line 52, delete "on" after "cast".

Column 27, line 47, change "denote" to --denotes--.

Column 30, line 16, change "chlorode" to --chloride--.

Column 30, line 19, change "if" to --of--.

Column 31, line 6, delete "which".

Column 32, line 19, change "interconeccted" to --interconnected--.

UNITED STATES PATENT AND TRADEMARK OFFICE
CERTIFICATE OF CORRECTION

PATENT NO. : 5,401,812
DATED : March 28, 1995
INVENTOR(S) : Hiroshi Yamamoto, et al It is certified that error appears in the above-indentified patent and that said Letters Patent is hereby corrected as shown below:

Column 34, line 9, change "5n" to --in--.

Signed and Sealed this

Thirteenth Day of February, 1996

Attest:

BRUCE LEHMAN

Attesting Officer    Commissioner of Patents and Trademarks